US006330699B1

United States Patent
Yoshioka et al.

(10) Patent No.: US 6,330,699 B1
(45) Date of Patent: Dec. 11, 2001

(54) ERROR COMPENSATING METHOD AND APPARATUS AND MEDIUM STORING AN ERROR COMPENSATING PROGRAM

(75) Inventors: Masafumi Yoshioka, Yokosuka; Atsushi Ohta; Masahiro Umehira, both of Yokohama, all of (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 0 days.

(21) Appl. No.: 09/628,301

(22) Filed: Jul. 28, 2000

Related U.S. Application Data

(62) Division of application No. 08/915,911, filed on Aug. 21, 1997.

(30) Foreign Application Priority Data

Aug. 23, 1996 (JP) ...................................................... 8-222480

(51) Int. Cl.⁷ .............................. G06F 11/00; G01R 31/28
(52) U.S. Cl. .......................................... 714/746; 714/712
(58) Field of Search ...................................... 714/712, 713, 714/746, 748, 749, 15, 18, 50; 75/219, 224

(56) References Cited

U.S. PATENT DOCUMENTS

| 4,439,859 | 3/1984 | Donnan ................................ 714/748 |
| 4,959,833 | 9/1990 | Mercola et al. ...................... 714/748 |
| 5,754,754 | 5/1998 | Dudley et al. ......................... 714/18 |
| 6,163,861 | * 12/2000 | Yoshioka et al. ..................... 714/712 |

OTHER PUBLICATIONS

H. Xie et al, "Data Link Control Protocols For Wireless ATM Access Channels"; IEEE International Conference on Universal Personal Communications, New York, vol. 4, Conf. 4, Nov. 6, 1995, pp. 753–757, XP 000690052.

D. Raychaudhuri et al., "WATMNET: A Prototype Wireless ATM System For Multimedia Personal Communication", IEEE International Conference on Communications, New York, IEEE, Jun. 23, 1996, pp. 469–477, XP000625717.

A. Sabaa et al, "A New Protocol For Flow Control In ATM Networks", Proceedings of the Pacific Rim Conference on Communications, Computers, and Signal Processing, New York, IEEE, May 17, 1995, pp. 96–99, XP000559525.

* cited by examiner

Primary Examiner—Christine T. Tu
(74) Attorney, Agent, or Firm—Finnegan, Henderson, Farabow, Garrett & Dunner L.L.P.

(57) ABSTRACT

An object of the present invention is to improve the transmission efficiency and reduce circuit size in error compensating techniques where bit errors occurring during transmission are compensated for by retransmission.

Transmission equipment get sequence number(s) from control information and sequence numbers which follows from the sequence number which correspond to newest data packet amongst the sequence numbers. and transmits data packet corresponding to these sequence numbers at a predetermined timing. On the other hand, reception equipment receives data packet from the transmission equipment, and manages the sequence numbers of not yet received data packets. The reception equipment then sends back sequence number(s) of predetermined number, which is smaller number than the maximum number of data packets which is sent from transmission equipment at a predetermined timing, which correspond to not yet received data packet as control Information for each predetermined timing.

3 Claims, 17 Drawing Sheets

(PRIOR ART)

(PRIOR ART)

(PRIOR ART)

(PRIOR ART)

(PRIOR ART)

(PRIOR ART)

ERROR COMPENSATING METHOD AND APPARATUS AND MEDIUM STORING AN ERROR COMPENSATING PROGRAM

This a division of application Ser. No. 08/915,911, filed Aug. 21, 1997, which is incorporated herein by reference.

BACKGROUND OF THE INVENTION

1. Field of the Invention

The present invention relates to error compensating technology which compensates for bit errors occurring during transmission of transmission data, by retransmitting the transmission data. In particular, the present invention relates to error compensating technology for the case where high speed data transmission is carried out by making up frames of a predetermined period using a plurality of short data packets such as ATM cells.

2. Description of the Related Art

In wireless transmission, the occurrence of bit errors during transmission can not be avoided, and therefore various error compensating techniques have been investigated. For these error compensating techniques, the FEC (Forward Error Correction) method and the ARQ (Automatic Repeat Request) method are effective. Here with the FEC method, a redundant bit is appended to the transmission data, and bit error correction is carried out based on this redundant bit. On the other hand, with the ARQ method, when a bit error is detected, the transmission data is retransmitted.

Of these methods, the FEC method is aimed at improving BER (bit error ratio). Therefore when the FEC method is used, then with respect to bit errors occurring in bursts, there are many cases where such bit errors cannot be adequately corrected. Therefore to carry out accurate data transmission, the ARQ method must be used.

FIG. 10 is a explanatory diagram illustrating an example of conventional error compensating processing using the ARQ method. In FIG. 10, the horizontal thick lines represent time lines for respective transmission equipment and reception equipment. The vertical dotted lines indicate divisions between transmission frames and receiving frames. The rectangular boxes denoted by numerals 21–28 indicate data packets. The numerals inside the rectangular boxes denote sequence numbers which are appended to the data packets. The arrows extending from the transmission equipment to the reception equipment indicate the flow of data packets. The arrows extending from the reception equipment to the transmission equipment indicate the flow of control information. The places marked with an X where the arrows do not reach the mating equipment indicate the occurrence of a bit error at the time of transmission of a data packet or control information.

With the data packets 21–28 to be transmitted from the transmission equipment, a sequence number is appended to each data packet unit. The reception equipment checks the reception condition, and when reception is normal, an ACK (acknowledgment) serving as a normal reception notification, together with the sequence number of the received data packet is sent back as control information. On the other hand, in the case where the reception equipment fails in reception, then an NAK (Negative Acknowledgment) is sent back as the control information. In the case where an ACK and the sequence number cannot be identified amongst the control information that has been sent back (or in the case where an NAK is received), then the transmission equipment retransmits the data package, which is assumed to have failed in transmission. By means of the above processing, all of the information can be reliably delivered to the reception equipment.

FIG. 11 is a block diagram illustrating a configuration example of transmission equipment in a conventional error compensating apparatus. In FIG. 11. numeral 10 denotes transmission equipment, numeral 100 denotes a sequence number appending circuit, numeral 101 denotes a data memory circuit, numeral 102 denotes a control information reception circuit, numeral 103 denotes a transmission control circuit, numeral 104 denotes a transmission circuit, and numeral 106 denotes a communication status management table.

In FIG. 11. the sequence number appending circuit 100 appends a sequence number to each data packet, and the data packet is then sent to the data memory circuit 101. The data memory circuit 101 temporarily stores the data packet. The control information reception circuit 102 receives control information (ACK and sequence number) from the reception equipment (refer to FIG. 12), and sends this control information to the transmission control circuit 103. A control section (not shown in the figure) of the communication status management table 106 then takes from the control information reception circuit 102 via the transmission control circuit 103, the sequence number (for example the sequence number for which normal reception has been verified) from amongst the control information. The control section then compares this sequence number (for normal reception) with the sequence number for the already transmitted data packet, and based on the comparison result, manages the sequence number of any data packets assumed to have not been normally transmitted. The transmission control circuit 103 refers to the communication status management table 106, to decide on the sequence number of the next data packet to be sent. Moreover, at a predetermined timing, the transmission control circuit 103 directs the transmission of the data packet corresponding to the sequence number to the data memory circuit 101 and the transmission circuit 104.

FIG. 12 is a block diagram illustrating a configuration example of the reception equipment in a conventional error compensating apparatus. In FIG. 12, numeral 11 denotes the reception equipment, numeral 110 denotes a data reception circuit, numeral 111 denotes a bit error detection circuit, numeral 112 denotes a sequence number separation circuit, numeral 113 denotes a retransmission control circuit, and numeral 114 denotes a data packet buffer.

The data reception circuit 110 receives the data packet transmitted from the transmission equipment (refer to FIG. 11). The bit error detection circuit 111 judges if a bit error has occurred in the received data packet. If a bit error is detected, the data packet is discarded. On the other hand, if a bit error is not detected, the bit error detection circuit 111 sends the data packet to the sequence number separation circuit 112. The sequence number separation circuit 112 then separates the sequence number from the data packet, and sends the separated sequence number to the retransmission control circuit 113. On the other hand, the data within the data packet is output via the data packet buffer 114. The retransmission control circuit 113 sends back to the transmission equipment (refer to FIG. 11) as control information, the sequence number received from the sequence number separation circuit 112, together with an ACK.

The above is an outline of a conventional error compensating apparatus which uses the ARQ method. Here the case has been described for where the sequence number of the normally received data packet is sent back together with an ACK. However, the case can also be considered where in a similar manner, the sequence number of the data packet which was not normally received is sent back together with an NAK. However with the abovementioned apparatus, in either case where the ACK or the NAK is sent back, the sending back of the ACK or the NAK is carried out for each receipt of one data packet.

With the above mentioned conventional apparatus, as representative examples of management methods for managing the sequence number of the data packet to be retransmitted, a GBN (Go Back N) method and an SR (Selective Repeat) method have been presented. With the GBN method, the data packet where the bit error is detected and all subsequent data packets are successively retransmitted. With the SR method, only the data packet in which the bit error has been detected is selectively retransmitted. As follows is a description of processing algorithms for the GBN method and the SR method used in the conventional apparatus. FIG. 13 is a flow chart illustrating an operation example of transmission equipment which constitutes an error compensating apparatus in the conventional error compensating apparatus which uses the GBN method. In FIG. 13, $SN_{TX}$ denotes a sequence number of a data packet which has been transmitted to the reception equipment. $SN_{NAK}$ denotes a sequence number of the oldest data packet amongst the data packets for which normal reception by the reception equipment has not been verified by the transmission equipment (referred to hereunder as the oldest number). $SN_{ACK}$ denotes a sequence number which has been recorded together with ACK in the received control information. WS (window size) denotes the number of data packets which the transmission equipment can sent consecutively, without receiving control information (that is to say receipt verification). This consecutive transmission is to prevent retransmission due to the occurrence of a bit error in the control information, even though the reception equipment has received normally. In step 50, the control information reception circuit 102 receives the control information which has been sent back from the reception equipment. In step 51, the control information reception circuit 102 judges if a bit error has not occurred in the received control information. In the case where a bit error has not occurred in the received control information, then in step 52, ($SN_{ACK}$+1) is substituted for sequence number $SN_{ACK}$ in the communication status management table 106. That is to say, with the communication status management table 106, since receipt of the sequence number $SN_{ACK}$ verifies that all of the data packets older than the data packet corresponding to the sequence number $SN_{ACK}$ have been normally received by the reception equipment, then the sequence number $SN_{ACK}$ is updated. Then in step 53, the transmission control circuit 103 judges if the difference between the sequence numbers $SN_{TX}$ and $SN_{ACK}$ is larger than the window size WS. In the case where the difference between the sequence numbers $SN_{TX}$ and $SN_{ACK}$ is larger than the window size WS, then in step 54, the transmission control circuit 103 substitutes $SN_{ACK}$ for the sequence number $SN_{TX}$. In other cases however, in step 55, the transmission control circuit 103 substitutes ($SN_{TX}$+1) for the sequence number $SN_{TX}$. Then in step 56, the transmission circuit 104 transmits the data packet having a sequence number $SN_{TX}$.

FIG. 14 is a flow chart illustrating an operation example of reception equipment which constitutes the error compensating apparatus in the conventional error compensating apparatus which uses the GBN method. In FIG. 14, SN denotes a sequence number of a data packet which the reception equipment has received. $SN'_{ACK}$ denotes a sequence number of a data packet for which normal reception has been verified. $SN'_{ACK}$ is used in managing the reception equipment.

At first in step 60, the data reception circuit 110 receives the data packet which has been output from the transmission equipment. Then in step 61, the bit error detection circuit 111 judges if a bit error has occurred In the received data packet. In step 62, the sequence number separation circuit 112 judges if the sequence number SN is equal to ($SN'_{ACK}$+1). If in step 61 and step 62, at least one of the judgment results is a NO, then in step 63, the bit error detection circuit 111 (or the sequence number separation circuit) discards that data packet. On the other hand, if in step 61 and step 62, both of the judgment results are a YES, then in step 64, the data packet buffer 114 stores this data packet as a normally received data packet. Then in step 65, the sequence number separation circuit 112 adds a one to the sequence number $SN'_{ACK}$. Then, in step 66, the retransmission control circuit 113 sends back the sequence number $SN'_{ACK}$ together with an ACK to the transmission equipment. In the case in FIG. 14 where the judgment result of step 62 is a NO, then in step 63 the data packet is discarded. However in this case, the data packet can be overwritten in the data packet buffer 114.

FIG. 15 is a flow chart illustrating an operation example of transmission equipment which constitutes an error compensating apparatus in the conventional error compensating apparatus which uses the SR method. In FIG. 15, $SN_{TX}$ denotes a sequence number of a data packet which has been transmitted to the reception equipment. $SN_{NAK}$ denotes a sequence number of the oldest data packet amongst the data packets for which normal reception by the reception equipment has not been verified by the transmission equipment. WS denotes the window size.

In step 71, the control information reception circuit 102 receives the control information which has been sent back from the reception equipment. In step 72, the communication status management table 106 records the transmission status of the data packet based on this control information. After this in step 73, the transmission control circuit 103 refers to the communication status management table 106 and reads out the sequence number $SN_{NAK}$. In step 74, the transmission control circuit 103 judges if the difference between the sequence numbers $SN_{TX}$ and $SN_{NAK}$ is larger than the window size WS. In the case where the difference between the sequence numbers $SN_{TX}$ and $SN_{NAK}$ is larger than the window size WS, then in step 75, the transmission circuit 104 transmits the data packet of the sequence number $SN_{NAK}$. Meanwhile in other cases, in step 76, the transmission control circuit 103 adds a one to $SN_{TX}$. Then in step 77, the transmission circuit 104 transmits the data packet of sequence number $SN_{TX}$.

FIG. 16 is a flow chart illustrating an operation example of reception equipment which constitutes an error compensating apparatus in the conventional error compensating apparatus which uses the SR method. In FIG. 16, SN denotes a sequence number of a data packet which has been received by the reception equipment.

At first in step 80, the data reception circuit 110 receives the data packet which has been output from the transmission equipment. Then in step 81, the bit error detection circuit 111 judges if a bit error has occurred in the data packet (that is to say, judges if the received data packet is correct). In the case where a bit error has occurred in the data packet, then in step 84, the bit error detection circuit 111 discards that data packet, and then in step 85, the retransmission control circuit 113 sends back an NAK. Meanwhile, in the case where a bit error has not occurred in the data packet, then in step 82 the data packet buffer 114 stores that data packet, and then in step 83, the retransmission control circuit 113 sends back the sequence number SN together with an ACX to the transmission equipment.

In the above, the control algorithm for the GBN method and the SR method used in the conventional apparatus has been described. Moreover, the description has been given for the case where the sequence number is a serial number. However alternatively, the sequence number may be a modulo of a suitable variable. In this case however, operational processing must be carried out with consideration of the newness of the data packet corresponding to the sequence number. rather than the absolute value of the number.

In the case where the abovementioned conventional error compensating technology is applied for example to high speed data communication using ATM, then various problems arise. Of these, the biggest problem is that, even though the data packet length (data transfer unit) is extremely short (for example 53 bytes), this must be supported up to extremely high transmission speeds. For example in the case where for each ATM cell (data packet). one byte is assigned for a sequence number, and two bytes are assigned for data for a CRC check used in bit error detection, then the transmission efficiency drops to about 6%. Furthermore, in the case where a wireless link is used for the transmission channel, then of course preamble becomes necessary and an efficiency drop occurs due to this. In such cases, as disclosed for example in Japanese pending patent application No. 3-53282 entitled "Satellite Communication Method", accommodating of a plurality of ATM cells (data packets) in a single frame is effective in improving the transmission efficiency.

FIG. 17 is a explanatory diagram illustrating an example of conventional error compensating processing for the case where a plurality of data packets are accommodated in one frame. In this figure, the SR method is used as one example for managing the data packet to be retransmitted. The horizontal thick lines in FIG. 17 represent time axes, the upper line representing the transmission equipment side, while the lower line representing the reception equipment side. In FIG. 17, the processing is carried out in sequence from the left. Moreover in FIG. 17, the vertical solid lines represents divisions between frames. The frames comprise a data region for accommodating data packets, and a control information region for accommodating control information, with the divisions between these indicated by vertical dotted lines. The rectangular boxes denoted by numerals 30–45 indicate data packets. The numerals inside the rectangular boxes denote the sequence numbers which are appended to the data packets. The arrows extending from the transmission equipment to the reception equipment indicate the flow of data packets. The arrows extending from the reception equipment to the transmission equipment indicate the flow of control information. The situation where a bit error occurs during transmission is indicated by an X. Here the case where four data packets are accommodated in one frame is shown as one example.

In this case, the transmission equipment appends a sequence number to each data packet to be transmitted, and then transmits the data packet. On the other hand, the reception equipment judges if a bit error has occurred for each of the received data packets, and sends a control information of the set of the sequence numbers of the normally received data packets to the transmission equipment per frame. The transmission equipment then determines the next data packet for transmission, based on all of the sequence numbers in the control information.

With the example shown in FIG. 17, the transmission equipment transmits the data packets with sequence numbers 1 through 4 in the first frame. At this time, it is assumed that during transmission a bit error occurs in the sequence packet of sequence number 1. The reception equipment sends back the sequence numbers of the data packets which have been normally received (that is to say, the sequence numbers 2~4) together with an ACK to the transmission equipment as control information. Since out of the data packets sent in the first frame (that is to say the data packets of sequence number 1~4) the transmission equipment is not able to verify normal reception of the data packet of sequence number 1. then at first in the second frame, the transmission equipment transmits the data packet of sequence number 1 and in the remaining data regions, transmits in succession, the data packets of sequence number 5 and after.

With the example shown in FIG. 17. the transmission equipment similarly transmits in the third frame, the data packets of sequence numbers 8~11. The reception equipment then normally receives all of these data packets, and sends back the sequence numbers (that is sequence numbers 8~11) together with the ACK to the transmission equipment as control information. At this time, it is assumed that during transmission a bit error occurs in the control information. Since a bit error has occurred in the control information, the transmission equipment regards the transmission of all the data packets to have failed, and therefore retransmits the data packet transmitted in the third frame (that is to say the data packets of sequence numbers 8~11) in the fourth frame.

Here with the control information sent back by the reception equipment. the maximum number of sequence numbers corresponding to an ACK (or an NAK) is equal to the maximum number of data packets which can be accommodated in one frame. For example in the case where the transmission speed of the ATM is approximately 10Mbps. then 26ATM cells (data packets) are sent per 1ms. In this case, a volume of (the bit length necessary for addressing the sequence number)×(the maximum number of data packets which can be accommodated within one frame) is required for each frame as a control information region. Therefore if the transmission speed is not fast than maximum transmission speed. the ratio of the control information region to the total region of transmission speed increase. Moreover, the transmission equipment must judge for all of the sequence numbers in the control information for each frame, if retransmission is necessary. Therefore the processing load on the transmission equipment is extremely large. Moreover, a table for managing the arrival circumstances of a large number of data packets is necessary, and hence the scale of the hardware expands.

In the case where the GBN method is applied, the above problems for when the SR method is applied can be resolved. However with the GBN method, if a bit error occurs in one data packet inside one frame, then the reception equipment discards that data packet and all the subsequent data packets inside that frame. As a result, the transmission equipment retransmits the data packet where the bit error has occurred and all subsequent data packets of that frame. At this time, even though a bit error may have occurred only in the data packet positioned at the head or close to the head of the frame, that data packet and all subsequent data packets are discarded. There is therefore the problem in the case where the GBN method is applied, in that with an increase in the BER (bit error ratio), the throughput drops sharply.

SUMMARY OF THE INVENTION

It is an object of the present invention to provide an error compensating method and apparatus which, with error compensation using an ARQ method, can improve transmission efficiency of data packets and control information, and improve transmission quality by just having a simple processing. Moreover it is an object of the present invention to provide a medium in which is stored an error compensating program for executing such an error compensating method with a computer.

The present invention is essentially characterized in that in the case where high speed data transmission is carried out by constructing frames of predetermined periods using a plurality of short data packets, and the transmission status of the data packets is managed with the frames as units, the number of sequence numbers to be transmitted is limited so that not all sequence numbers of normally received data packets, or all sequence numbers of data packets which have failed in reception are transmitted as control information.

The present invention is preferably characterized in comprising transmission equipment incorporating: a sequence number appending circuit for appending sequence numbers to data packets, one by one, which store data for transmission, a data memory circuit for storing data packets to which sequence numbers have been appended, a control information reception circuit for receiving control information which includes a plurality of or just singularity of sequence numbers, a transmission sequence number assigning circuit for assigning said sequence numbers which is accommodated in the received control information and a series of sequence numbers following from the sequence number corresponding to the newest data packet amongst the sequence numbers, a transmission control circuit for carrying out transmission assignment of the data packets corresponding to the it assigned sequence numbers, and a transmission circuit for reading a data packet from the data memory circuit in accordance with the transmission assignment and transmitting this to the reception equipment via the transmission path, and reception equipment incorporating: a data reception circuit for receiving data packets from the transmission equipment, a bit error detection circuit for judging if a bit error has occurred for each received data packet, a sequence number separation circuit for acquiring a sequence number corresponding to said data packet from the data packets for which a bit error has not occurred, a data packet buffer which stores data packets and outputs to the outside, a reception sequence number management circuit for managing the reception status of respective data packets, and for outputting for each predetermined time, a plurality of sequence numbers of not yet received data packets or singularity of sequence number corresponding to the oldest data packet from amongst a sequence number group for not yet received data packets, and a retransmission control circuit for sending back the output sequence numbers to the transmission equipment via the transmission path as control information.

In this case, even in the case where the bit error ratio is high, the transmission efficiency of the data packet and the control information can be improved. Moreover, in this case the hardware scale and the processing load can be kept to a minimum.

With the conventional technology, one data packet is accommodated in one frame, and in the case where this data packet is normally received, an ACK and a sequence number (or if reception fails, an NAK and a sequence number) are sent back. On the other hand, with the present invention, a plurality of data packets are accommodated in one frame, and control information (ACK or NAK, and sequence number) related to these data packets are combined and sent back. Moreover, the point that at this time the control information is limited to information related to only one part of data packets differs from the conventional technology.

Furthermore, the invention is characterized in that preferably the reception sequence number management circuit comprises: a sequence number expected value table for managing the same number of sequence numbers as the sequence numbers inside the control information, a sequence number comparison circuit for judging if a sequence number of a received data packet is in the sequence number expected value table, a table updating control circuit for replacing, in this case where the sequence number of the received data packet is in the table, said sequence number in the table for the sequence number which follows the sequence number corresponding to the newest data packet among the sequence number in the table, and outputting all the sequence number in the table.

In this case, the sequence number in the control information which the reception equipment is to sent back can be always acquired during the transmission processing. Furthermore, in this case only a limited number of sequence numbers is managed and hence correspondence up to an extremely large window size (the number of data packets in one frame) is possible.

With the conventional SR method, the total number of sequence numbers corresponding to the window size had to be managed. In contrast the present case differs from the conventional SR method in that the number of sequence numbers to be managed is limited.

Alternatively, the invention is characterized in that preferably the reception sequence number management circuit comprises: a sequence number expected value table for managing a larger number of sequence numbers than the sequence numbers inside the control information, a sequence number comparison circuit for judging if a sequence number of a received data packet is in the sequence number expected value table, and a table updating control circuit for replacing, in this case where the sequence number of the received data packet is in the table, said sequence number in the table for the sequence number which follows the sequence number corresponding to the newest data packet among the sequence number in the table, and a sequence number selection circuit for outputting part of the sequence numbers in the sequence number expected value table.

In this case, the amount of information in the control information which is sent back to the transmission equipment from the reception equipment can be suppressed, even when the control efficiency for the retransmission processing is improved by increasing the number of sequence numbers which are managed by the sequence number expected value table. As a result, overall transmission efficiency is improved.

Due to the above aspects of the invention, bit error compensation occurring in high speed wide band transmission can be effectively carried out.

DESCRIPTION OF THE PREFERRED EMBODIMENTS

As follows is a description of embodiments of the present invention with reference to the drawings.

1. First Embodiment (Corresponding to the Invention Disclosed in Claims 1, 2, 5, 6, 10 and 11)

Figure 1:
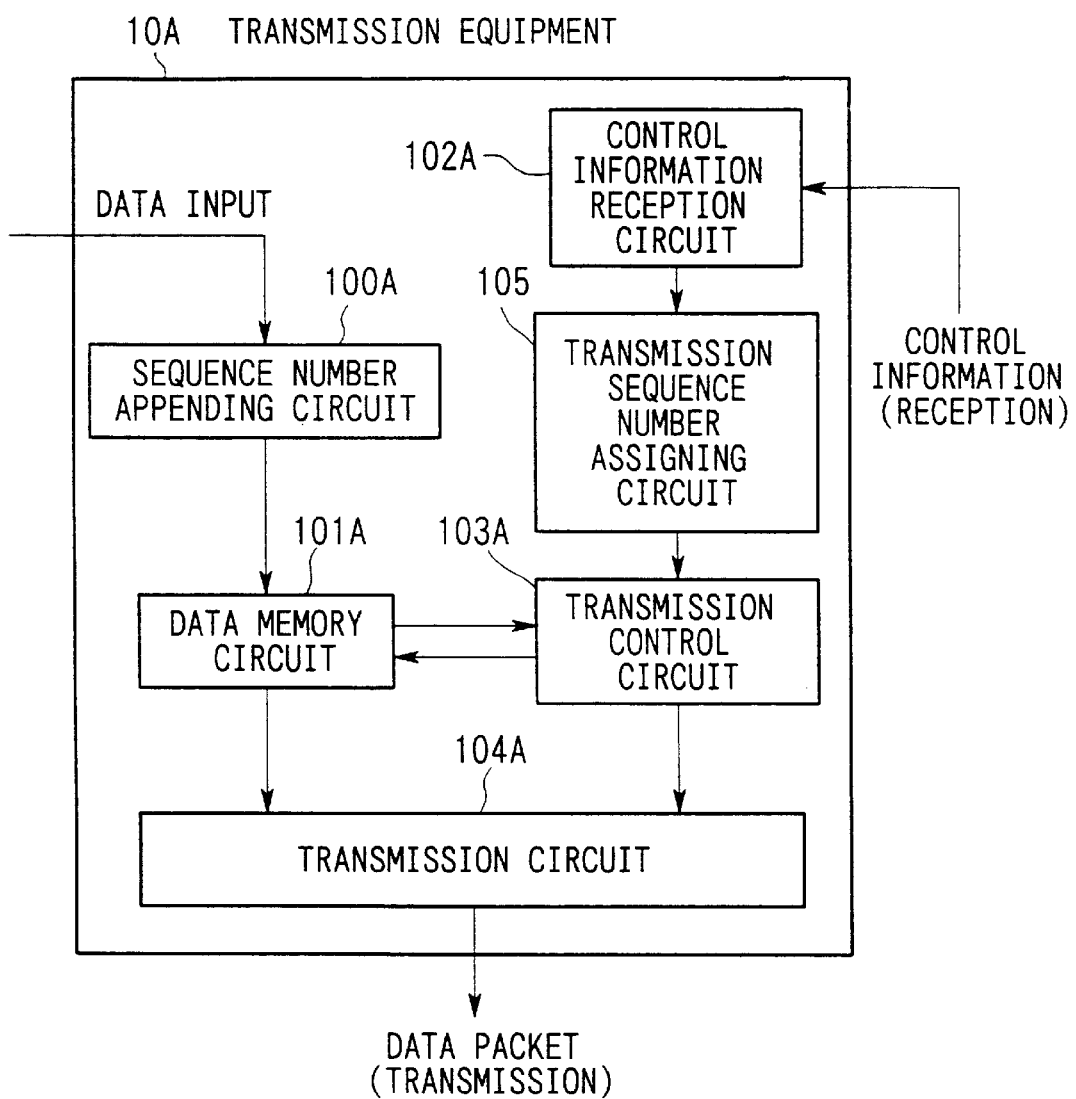
FIG. 1 is a block diagram illustrating an example of transmission equipment which constitutes an error compensating apparatus according to a first embodiment of the present invention.

FIG. 1 is a block diagram illustrating an example of transmission equipment which constitutes an error compensating apparatus according to a first embodiment of the invention. In FIG. 1, 10A denotes transmission equipment, 100A denotes a sequence number appending circuit, 101A denotes a data memory circuit, 102A denotes a control information reception circuit, 103A denotes a transmission control circuit, 104A denotes a transmission circuit, and 105 denotes a transmission sequence number assigning circuit.

In FIG. 1, the sequence number appending circuit 100A appends a sequence number to the data packet which stores the input data. The data packet which has been appended with the sequence number is then sent to the data memory circuit 101A, and stored therein. Then the sequence number of this data packet and the address information which is being stored by this data packet is then sent to the transmission control circuit 103A. Meanwhile, the control information reception circuit 102A receives the control information which is sent back by the reception equipment(refer to FIG. 2), and sends this information to the transmission sequence number assigning circuit 105. The transmission sequence number assigning circuit 105 uses this control information to compute the sequence number of the data packet to be transmitted next, and outputs this sequence number to the transmission control circuit 103A. An example of a specific algorithm for sequence number assignment in the transmission sequence number assigning circuit 105 is shown in FIG. 3. The transmission control circuit 103A receives this sequence number and carries out an assignment for outputting the data packet corresponding to this sequence number to the data memory circuit 101A and to the transmission circuit 104A. The transmission circuit 104A receives this data packet and transmits it to the reception equipment.

Figure 2:
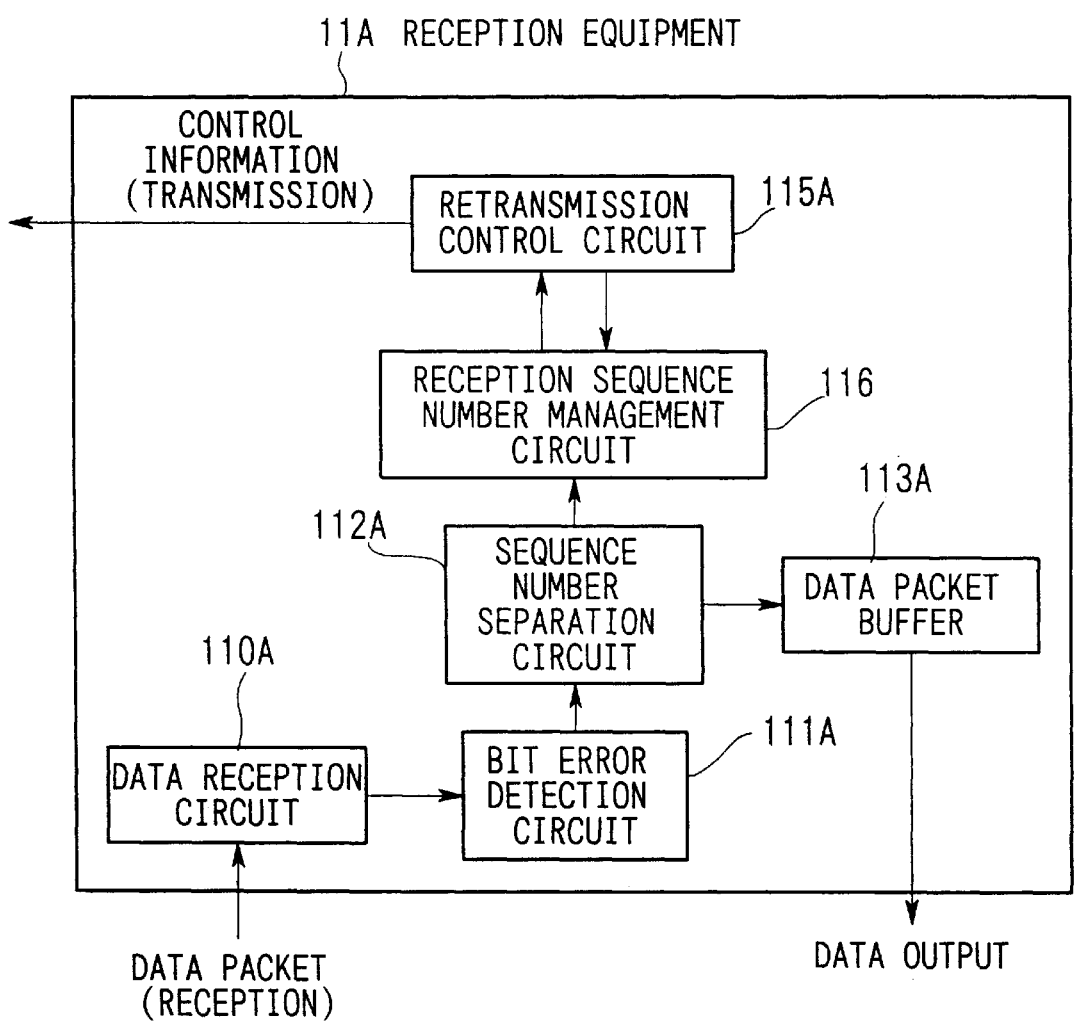
FIG. 2 is a block diagram illustrating an example of reception equipment which constitutes the error compensating apparatus according to the first embodiment of the present invention.
Figure 3:
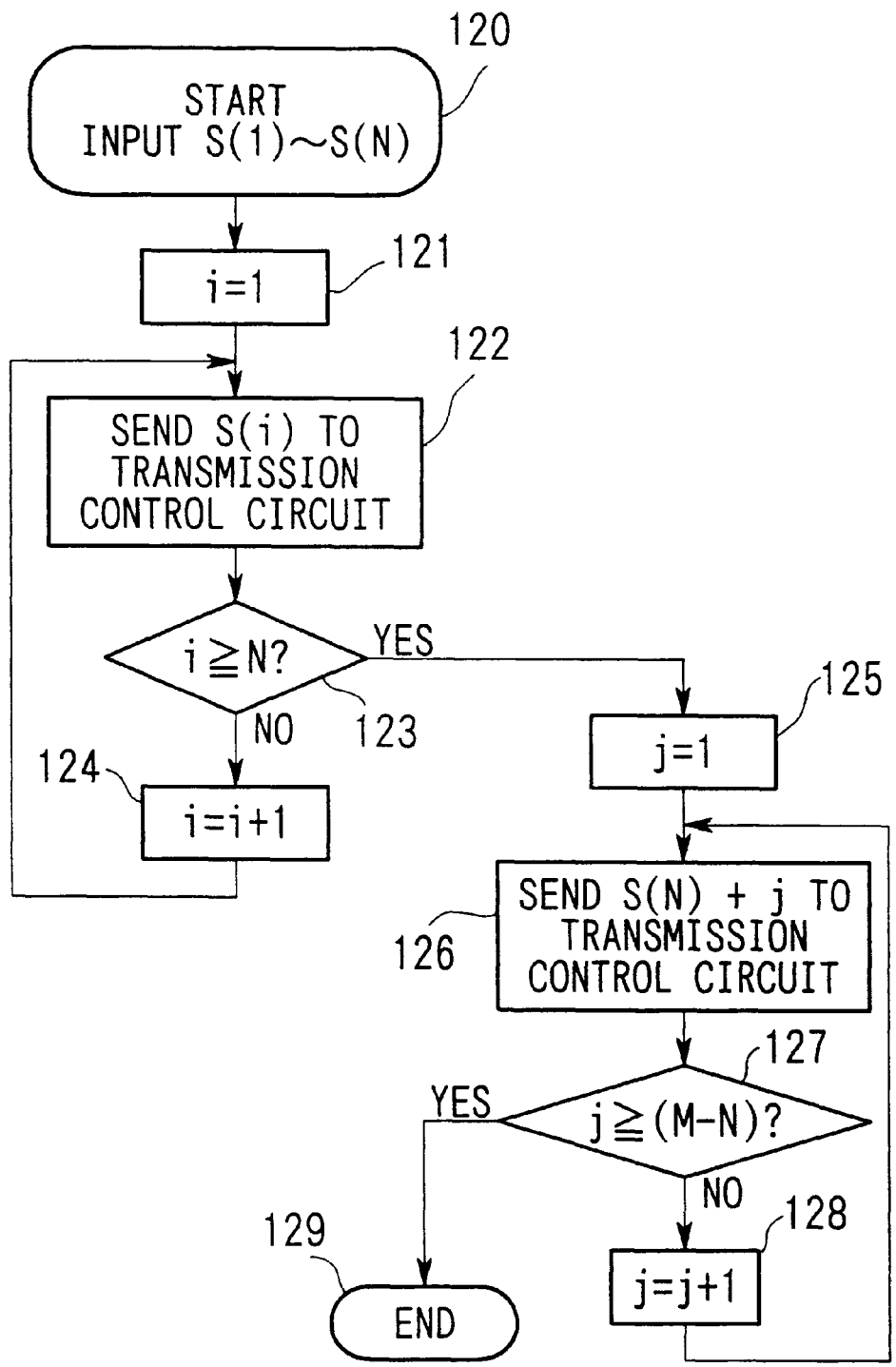
FIG. 3 is a flow chart illustrating an example of an algorithm used in the transmission equipment of the first embodiment of the present invention, for assigning the sequence number of a data packet to be transmitted next.

FIG. 2 is a block diagram illustrating an example of reception equipment which constitutes an error compensating apparatus according to the first embodiment of the present invention. In FIG. 2, 11A denotes reception equipment, 110A denotes a data reception circuit, 111A denotes a bit error detection circuit, 112A denotes a sequence number separation circuit, 113A denotes a data packet buffer, 115A denotes a retransmission control circuit, and 116 denotes a reception sequence number management circuit.

Figure 4:
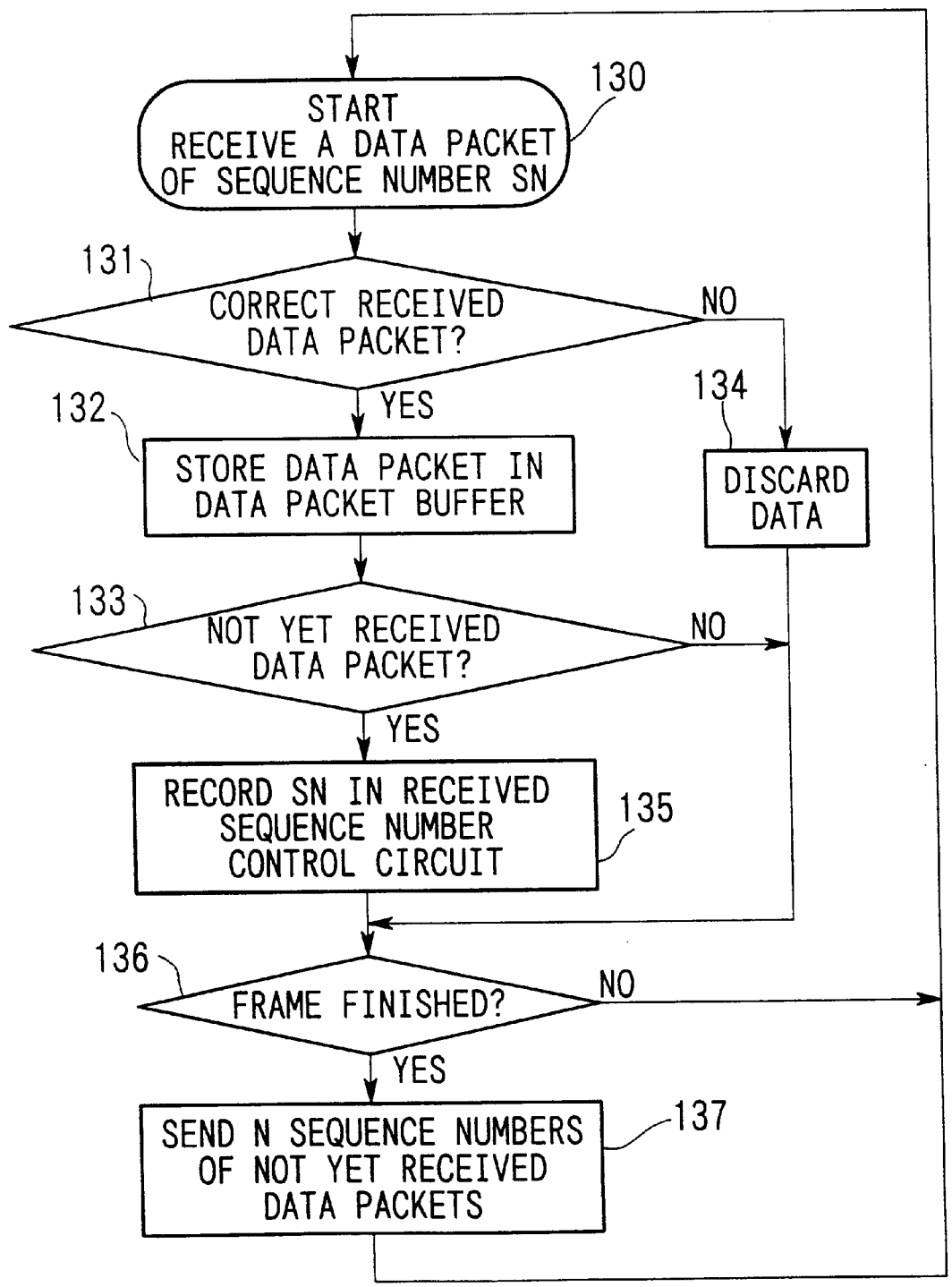
FIG. 4 is a flow chart illustrating an example of an algorithm which creates control information in the reception equipment, of the first embodiment of the present invention.

In FIG. 2, the data reception circuit 110A receives the data packet sent from the transmission equipment (refer to FIG. 1). The bit error detection circuit 111A judges if a bit error has occurred in this data packet. The data packet in which a bit error has not occurred, is output to the sequence number separation circuit 112A. The sequence number separation circuit 112A separates the sequence number from this data packet, and then outputs the separated sequence number to the reception sequence number management circuit 116. The sequence number separation circuit 112A also outputs the data packet from which the sequence number has been separated to the data packet buffer 113A. The reception sequence number management circuit 116 manages the sequence numbers of any data packets for which reception has failed. The data packet for which the sequence number has been separated is temporarily stored in the data packet buffer 113A and then output. The retransmission control circuit 115A sends back to the transmission equipment 10A, the control information for each predetermined time period. At this time the retransmission control circuit 115A receives a predetermined number of optional sequence numbers or sequence numbers based on a predetermined rule which are selected from amongst the plurality of sequence numbers of not yet received data packets from amongst the sequence numbers being managed in the reception sequence number management circuit 116 (the sequence numbers of the not yet received data packets), and generates the control information. An example of a specific algorithm for creating control information in the reception equipment 11A is shown in FIG. 4.

As an example of selection rules for the sequence numbers in the reception sequence number management circuit 116, selection rules (a), (b) illustrated below are considered. Here Q is the number of sequence numbers which the reception sequence number management circuit 116 manages. $S_{RX}(1)$~$S_{RX}(Q)$ denote the sequence numbers which is managed as not yet received data packet by the reception sequence number management circuit 116. Here $S_{RX}(i)$ is the sequence number of the I th oldest data packet in $S_{RX}(1)$~$S_{RX}(Q)$. N is the number of sequence numbers amongst the control information sent back to the transmission equipment. A provision here is that N<Q.

(Selection rule a) N−1 sequence numbers $S_{RX}(1)$~$S_{RX}(N-1)$ in sequence from the oldest, and either the newer sequence number amongst the sequence number $S_{RX}(Q)$ or the sequence number which follows after the sequence number of the newest received data packet are selected from amongst the sequence numbers $S_{RX}(1)$~$S_{RX}(Q)$, and made the control information.

(Selection rule b) The N sequence numbers $S_{RX}(1)$~$S_{RX}(N)$ in sequence from the oldest, are selected from amongst the sequence numbers $S_{RX}(1)$~$S_{RX}(Q)$, and made the control information.

In the above description, the time order of the sequence numbers was made the selection criterion. However the selection criterion is not necessarily limited to time order, and the present invention can be realized with other elements than above as the selection criterion.

Moreover, in the above description, the reception sequence number management circuit 116 selects a predetermined number of sequence numbers. The number of sequence numbers for selection can however be only 1.

Next is a description of the operation of the error compensating apparatus of the above construction. The operation of the present apparatus, apart from that described below (referring to FIG. 3 and FIG. 4), is the same as for the conventional apparatus.

FIG. 3 is a flow chart illustrating an example of an algorithm used in the transmission equipment according to the first embodiment of the present invention, for assigning the sequence number of the data packet to be transmitted next. In FIG. 3, N is the number of sequence numbers which the retransmission management table (not shown in the figure) manages. Here the retransmission management table is built into the transmission sequence number assigning circuit 105. M is the maximum number of data packets which can be accommodated within one frame. S(1)~S(N) denotes the sequence numbers of the data packets required to be transmitted by the reception equipment. That is to say, S(1)~S(N) are the sequence numbers in the control information. Here S(N) is the sequence number of the newest number from amongst the sequence numbers S(1)~S(N).

When the control information reception circuit 102A receives the control information sent back from the reception equipment (refer to FIG. 2) for each respective frame, then in step 120, the transmission sequence number assigning circuit 105 receives the sequence numbers S(1)~S(N). After this, while incrementing variable i from 1 to N in steps 121~124. the transmission sequence number assigning circuit 105 outputs the sequence numbers S(1)~S(N) to the transmission control circuit 103A. As a result of the above processing. N data packets are determined from amongst the maximum number (that is to say M) of data packets which can be accommodated in one frame. After this, in order to determine the remaining (M−N) data packets, then while incrementing variable j from 1 to (M−N) in steps 125~128, the transmission sequence number assigning circuit 105 outputs the sequence number from (S(N)+1) to (S(N)+M−N) to the transmission control circuit 103A. The transmission control circuit 103A then transmits the data packets corresponding to the sequence numbers which have been assigned by the above processing, to the reception equipment.

FIG. 4 is a flow chart illustrating an example of an algorithm which creates the control information in the reception equipment of the first embodiment of the present invention. In FIG. 4. SN denotes a sequence number of a data packet which the reception equipment has received. Q is the number of sequence numbers which the reception sequence number management circuit 116 manages.

In step 130, the data reception circuit 110A receives the data packet of sequence number SN from the transmission equipment. In step 131, the bit error detection circuit 111A judges if a bit error has occurred in the data packet. In the case where a bit error has occurred, then in step 134 the bit error detection circuit 111A discards this data packet. On the other hand, in the case where a bit error has not occurred, then in step 132. the data packet buffer 113A stores this data packet, and then in step 133, the reception sequence number management circuit 116 judges if this data packet (that is to say the data packet of sequence number SN) has not yet been received. If not yet received, then in step 135, the reception sequence number management circuit 116 records the reception of sequence number SN. Then, in step 136, the retransmission control circuit 115A judges if the processing of steps 130~135 has been carried out for all of the data packets within one frame. If the processing for all of the data packets within one frame has been completed, then the processing proceeds to step 137. In step 137, once the output requirements for the control information have been input from the retransmission control circuit 115A, then the reception sequence number management circuit 116 outputs only a predetermined number of optional sequence numbers or sequence numbers based on a predetermined rule which are selected from amongst the plurality of sequence numbers of not yet received data packets as control information. In the example shown in FIG. 4, sequence numbers S(1)~S(N) are output.

In FIG. 4, the processing of step 133 may be omitted. In this case, when the processing of step 132 is completed, processing then proceeds as is to step 135.

2. Second Embodiment (Corresponding to the Invention Disclosed in Claims 3, 7 and 12).

Next is a description of a second embodiment of the present invention.

Figure 5:
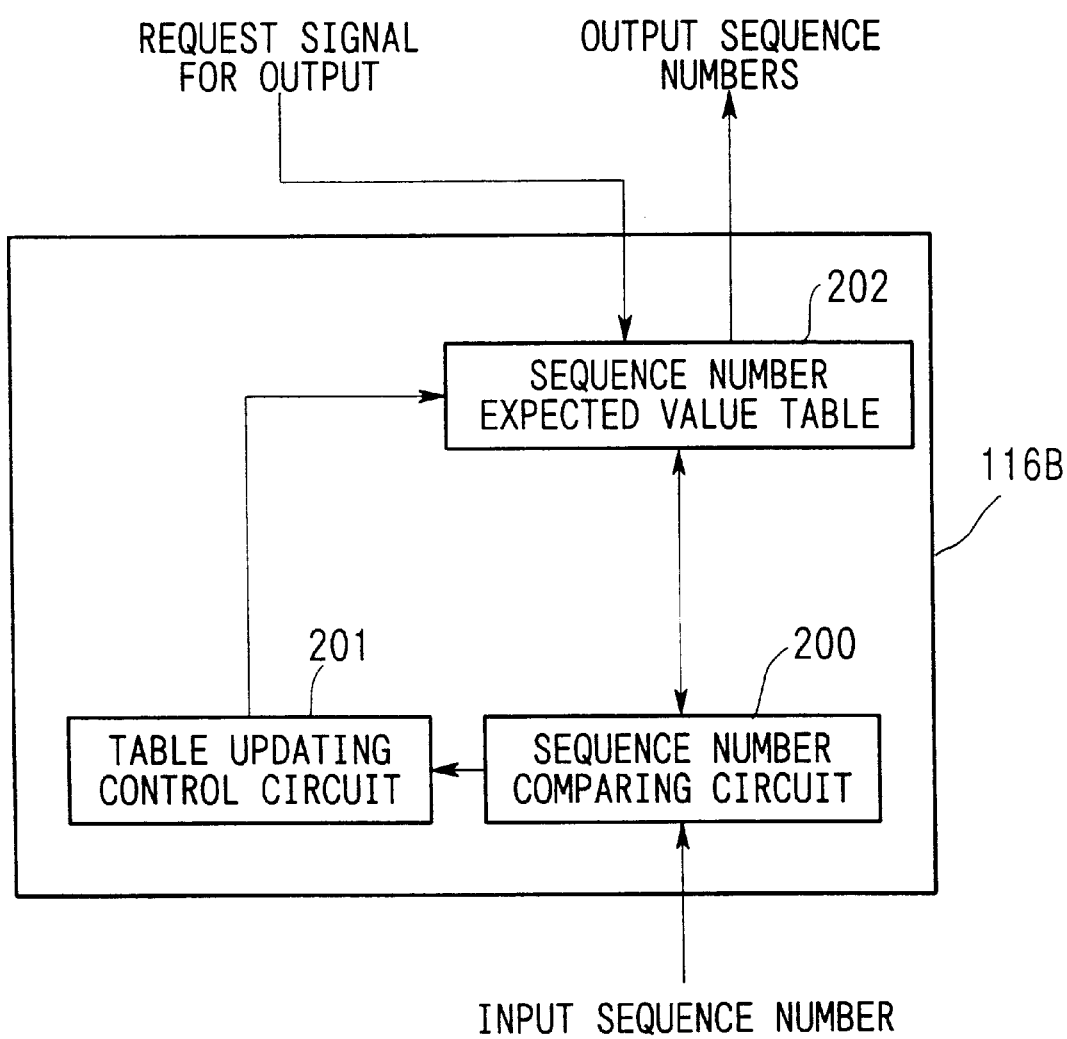
FIG. 5 is a block diagram illustrating a configuration example of a reception sequence number management circuit 116B, according to a second embodiment of the present invention.

With the error compensating apparatus according to the second embodiment, the reception sequence number management circuit 116 (refer to FIG. 2) in the error compensating apparatus of the first embodiment, is replaced with the reception sequence number management circuit 116B shown in FIG. 5. With the error compensating apparatus according to the second embodiment, the construction apart from that of the reception sequence number management circuit 116B, is the same as for the error compensating apparatus of the first embodiment.

FIG. 5 is a block diagram illustrating a configuration example of the reception sequence number management circuit 116B according to the second embodiment of the present invention. In FIG. 5, numeral 200 denotes a sequence number comparison circuit, numeral 201 denotes a table updating control circuit, and numeral 202 denotes a sequence number expected value table. The reception sequence number management circuit 116B creates the control information by updating successively one by one the sequence numbers of the not yet received data packets.

In FIG. 5, the sequence number expected value table 202 only manages a predetermined number of the sequence numbers (expected values) of the data packets which are expected to be received next. The sequence number comparison circuit 200, on receipt of a sequence number refers to the sequence number expected value table 202, and checks as to whether or not an expected value matching the sequence number is in the sequence number expected value table 202. In the case where there is an expected value which matches the sequence number, the sequence number comparison circuit 200 outputs this sequence number to the table updating control circuit 201. The table updating control circuit 201 then updates the sequence number expected value table 202 for this sequence number. Meanwhile, the sequence numbers (expected values) inside the sequence number expected value table 202 are transmitted for a predetermined period to the transmission equipment side as control information.

Next is a description of the operation of the error compensating apparatus of the abovementioned construction. With the error compensating apparatus according to the second embodiment, the operation apart from that of the reception sequence number management circuit 116B, is the same as for the error compensating apparatus of the first embodiment.

Figure 6:
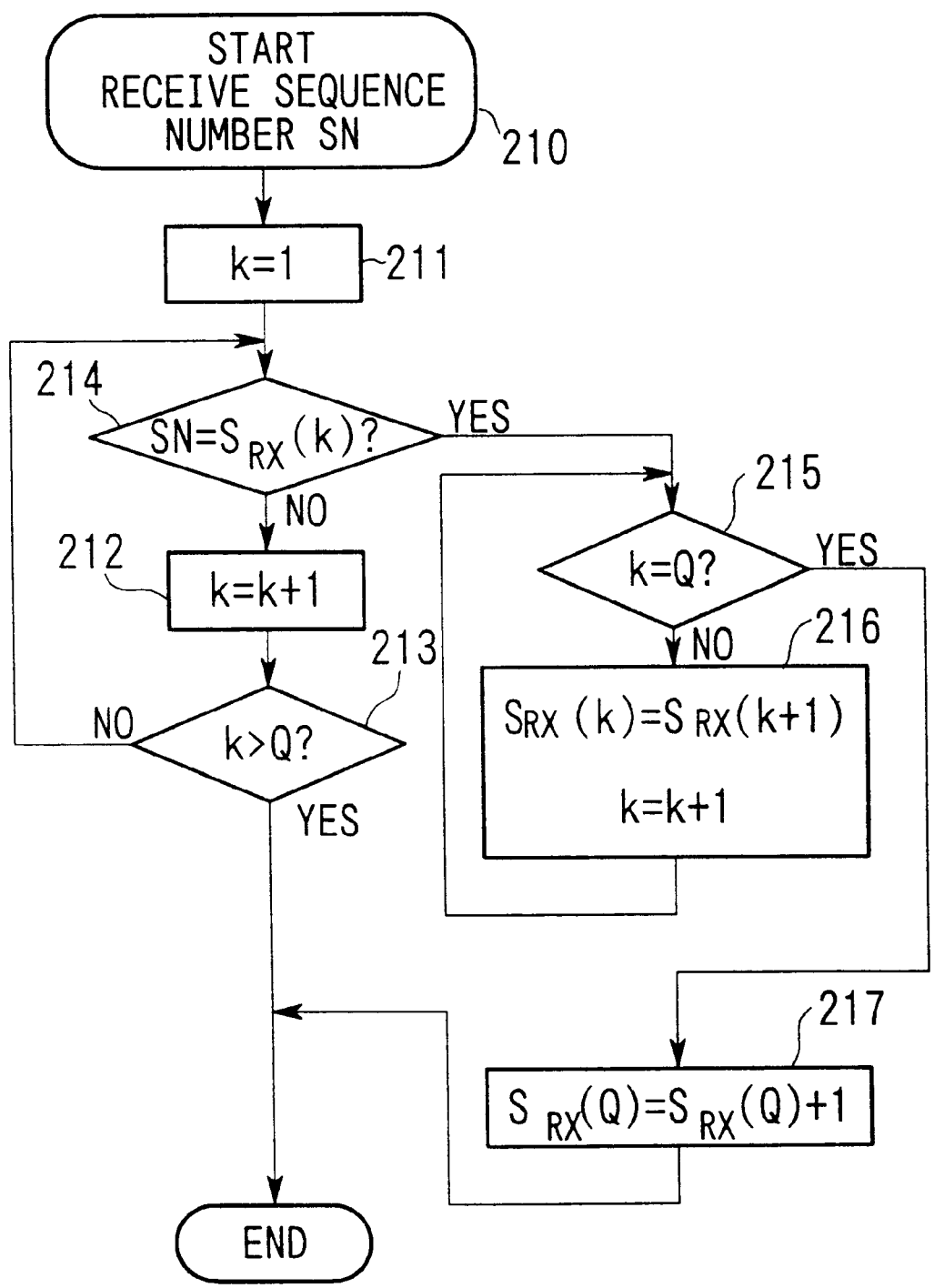
FIG. 6 is a flow chart illustrating an example of an algorithm used in the reception equipment of the second embodiment of the present invention for managing sequence numbers to be sent back as control information.

FIG. 6 is a flow chart illustrating an example of an algorithm used in the reception equipment of the second embodiment of the present invention for managing sequence numbers to be sent back as control information (that is to say, for operation of the reception sequence number management circuit 116B). The processing shown in FIG. 6 illustrates an extension example for the processing of steps 133, 135 shown in FIG. 4. In FIG. 6, SK denotes a sequence number of a data packet which the reception equipment has received. Q is the number of sequence numbers which the reception sequence number management circuit 116B manages. $S_{RX}(1) \sim S_{RX}(Q)$ denote the sequence numbers (expected values) of the data packets expected to be received next. Here $S_{RX}(1)$ is the sequence number corresponding to the oldest data packet, while $S_{RX}(Q)$ is the sequence number corresponding to the newest data packet.

In step 210, the reception sequence number management circuit 116B is advised of the sequence number SN of the data packet which has been normally received. In steps 211~214, while incrementing a predetermined variable k, the sequence number comparison circuit 200 searches to see if the sequence number SN is amongst the sequence numbers $S_{RX}(1) \sim S_{RX}(Q)$. If the sequence number SN matches any of the sequence numbers $S_{RX}(1) \sim S_{RX}(Q)$, then the sequence number comparison circuit 200 stops incrementing the variable k at that point in time.

Then in steps 215 and 216, the table updating control circuit 201, while incrementing the variable k from the current value (that is to say the stopped value) to (Q-1). substitutes $S_{RX}(k+1)$ for $S_{RX}(k)$ according to the respective values of the variable k. When the variable k reaches Q, then in step 217 the table updating control circuit 201 substitutes $S_{RX}(Q)+1$ for $S_{RX}(Q)$ with k=Q. By means of the abovementioned processing sequence, the reception sequence number management circuit 116B successively updates the sequence numbers $S_{RX}(1) \sim S_{RX}(Q)$ each time a data packet is received.

With the second embodiment, the order of the sequence numbers to be transmitted can be any order. However transmission from the sequence number corresponding to the old data packet is preferable.

3. Third Embodiment (Corresponding to the Invention Disclosed in Claims 4, 8, 9, 13 and 14).

Next is a description of a third embodiment of the present invention. With the error compensating apparatus according to the third embodiment, the reception sequence number management circuit 116 (refer to FIG. 2) in the error compensating apparatus of the first embodiment, is replaced with the reception sequence number management circuit 116C shown in FIG. 7. With the error compensating apparatus according to the third embodiment, the construction apart from that of the reception sequence number management circuit 116C, is the same as for the error compensating apparatus of the first embodiment.

Figure 7:
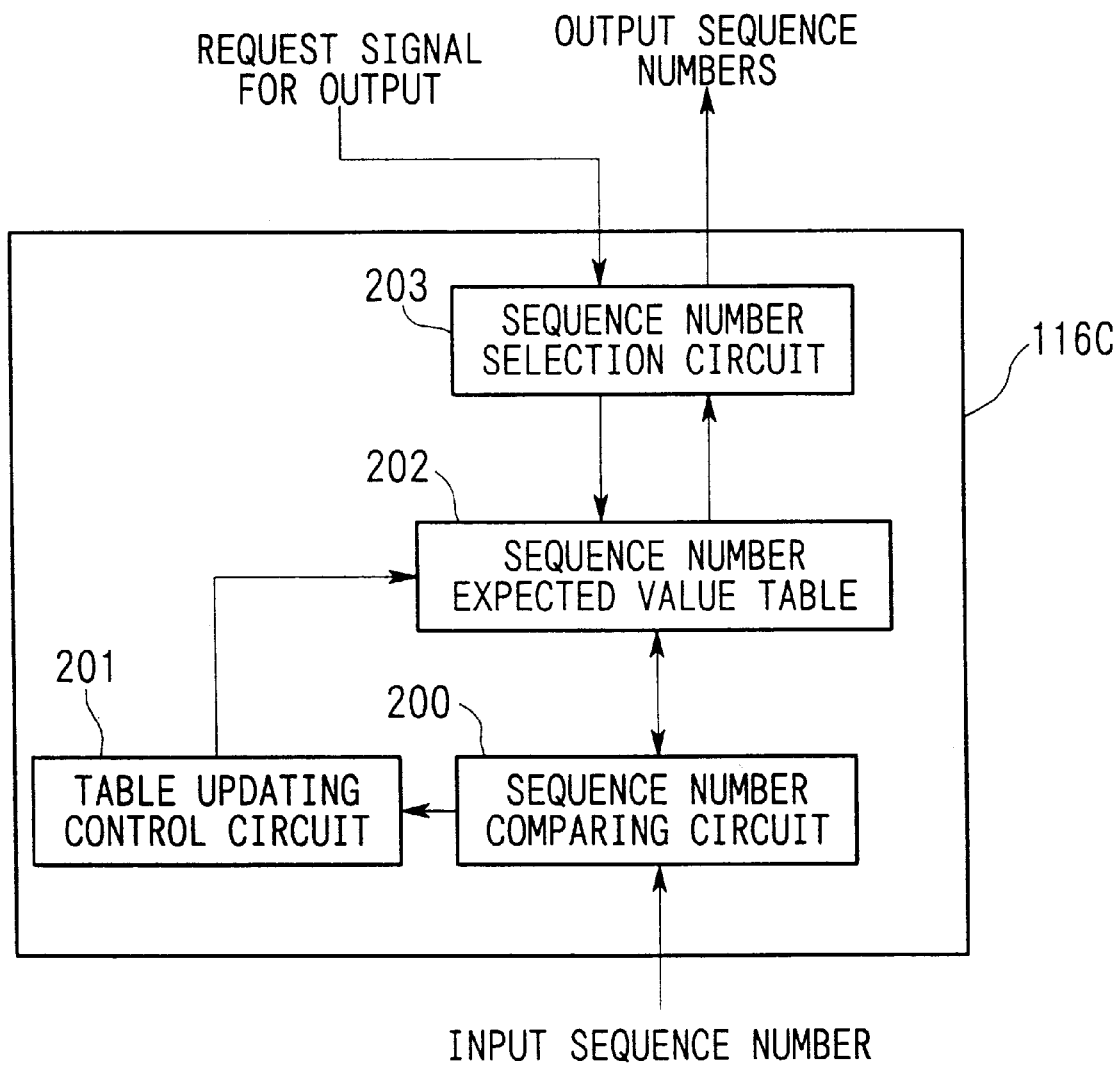
FIG. 7 is a block diagram illustrating a configuration example of a reception sequence number management circuit 116C, according to a third embodiment of the present invention.

FIG. 7 is a block diagram illustrating a configuration example of the reception sequence number management circuit 116C according to the third embodiment of the present invention. In FIG. 7, numeral 200 denotes a sequence number comparison circuit, numeral 201 denotes a table updating control circuit, numeral 202 denotes a sequence number expected value table, and numeral 203 denotes a sequence number selection circuit. The reception sequence number management circuit 116C creates the control information by updating successively one by one the sequence numbers of the not yet received data packets, in a similar manner to the reception sequence number management circuit 116B (refer to FIG. 5) of the second embodiment. However this differs from the reception sequence number management circuit 116B, in that at the time of creating the control information, only one part from amongst the plurality of sequence numbers (expected values) in the sequence number expected value table 202 is selected and output.

In FIG. 7, the sequence number expected value table 202 only manages a predetermined number of the sequence numbers (expected values) of the data packets which are expected to be received next. The sequence number comparison circuit 200. on receipt of a sequence number refers to the sequence number expected value table 202, and checks as to whether or not an expected value matching the sequence number is in the sequence number expected value table 202. In the case where there is an expected value which matches the sequence number, the sequence number comparison circuit 200 outputs this sequence number to the table updating control circuit 201. The table updating control circuit 201 then updates the sequence number expected value table 202 for this sequence number. The construction to here is the same as for the reception sequence number management circuit 116B (of the second embodiment).

With the sequence number selection circuit 203, when the output requirements are input, then only a predetermined number of optional sequence numbers or sequence numbers based on a predetermined rule are selected from amongst the plurality of sequence numbers (expected values) in the sequence number expected value table 202. At this time, the sequence number selection circuit 203 selects a number of sequence numbers less than the number of sequence numbers (expected values) in the sequence number expected value table 202. The sequence numbers selected here are transmitted for a predetermined period to the transmission equipment side as control information.

As an example of selection rules for the sequence numbers in the sequence number selection circuit 203, selection rules (a), (b) illustrated below are considered. Here Q is the number of sequence numbers (expected values) which the sequence number expected value table 202 manages. $S_{RX}(1) \sim S_{RX}(Q)$ denote the sequence numbers (expected values) managed by the sequence number expected value table 202. Here $S_{RX}(1)$ is the sequence number of the oldest data packet, while $S_{RX}(Q)$ is the sequence number of the newest data packet. N is the number of sequence numbers amongst the control information sent back to the transmission equipment. A provision here is that N<Q. (Selection rule a) N−1 sequence numbers $S_{RX}(1) \sim S_{RX}(N-1)$ in sequence from the oldest, and the newest sequence number $S_{RX}(Q)$ are selected from amongst the sequence numbers $S_{RX}(1) \sim S_{RX}(Q)$, and made the control information.

(Selection rule b) The N sequence numbers $S_{RX}(1) \sim S_{RX}(N)$ in sequence from the oldest, are selected from amongst the sequence numbers $S_{RX}(1) \sim S_{RX}(Q)$. and made the control information.

In the above description, the time order of the sequence numbers was made the selection criterion. However the selection criterion is not necessarily limited to time order, and the present invention can be realized with other elements than above as the selection criterion.

Moreover, in the above description, the sequence number selection circuit 203 selects a predetermined number of sequence numbers. The number of sequence numbers for selection can however be only 1.

Next is a description of the operation of the error compensating apparatus of the abovementioned construction. The operation of the error compensating apparatus of the third embodiment is basically the same as the operation of the error compensating apparatus of the second embodiment. The operation however differs in step 137 (refer to FIG. 4). from the operation of the error compensating apparatus of the second embodiment. That is to say, with the error compensating apparatus of the second embodiment, in step 137, the same number of sequence numbers as the sequence numbers (expected value) in the sequence number expected value table 202 is selected and sent back as control information to the transmission equipment. On the other hand, with the error compensating apparatus of the third embodiment, in step 137 a number of sequence numbers which is less than the number of sequence numbers (expected values) in the sequence number expected value table 202 is selected and sent back as control information to the transmission equipment. Furthermore, with the third embodiment, the operation of the transmission equipment is basically the operation shown in FIG. 3.

With the third embodiment, the order of the sequence numbers to be transmitted can be any order. However transmission from the sequence number corresponding to the old data packet is preferable.

4. Comparison with Conventional Technology

Figure 17:
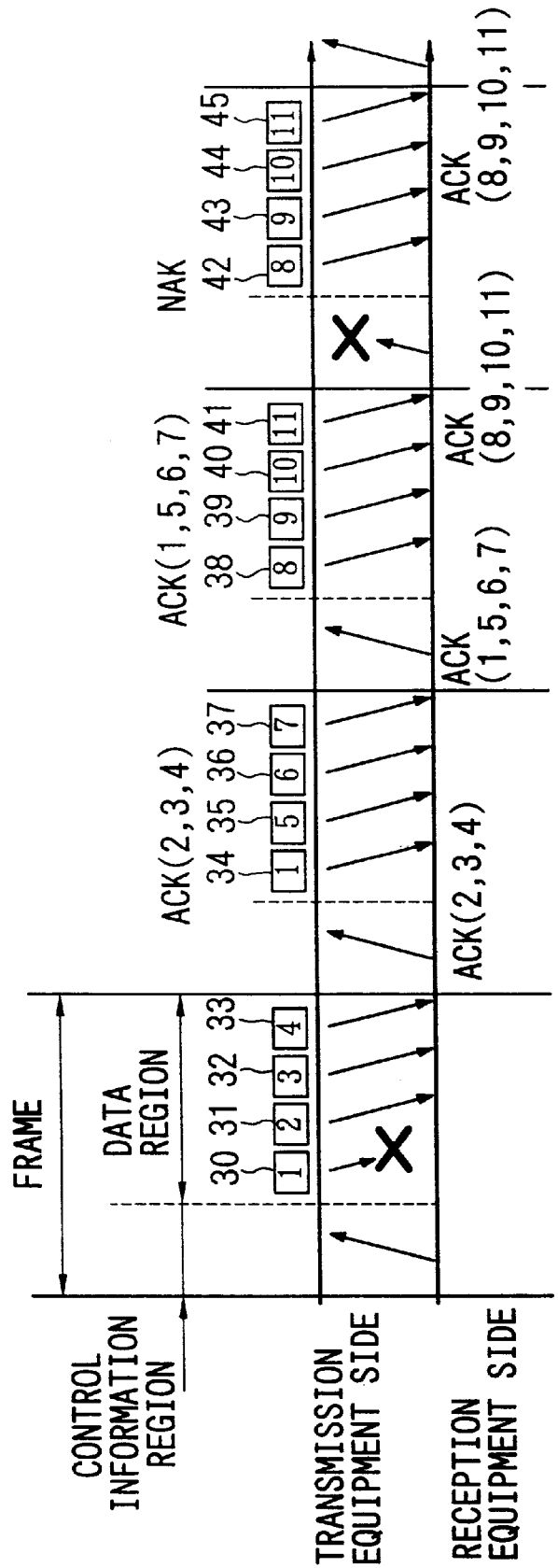
FIG. 17 is an explanation diagram illustrating an example of a conventional error compensation process in the case where a plurality of data packets are accommodated in one frame.

As follows is a comparison from the point of transmission efficiency, between the error compensating method of the present invention and the conventional error compensating method (SR system). In the case where bit error is compensated for by retransmission, then in addition to the data region used in transmission of the data packet, a control information region used in sending back the control information is necessary (refer to FIG. 17). Of the various conventional technologies, the SR method is one where processing is carried out so that transmission efficiency aimed only at the data region is a maximum. The transmission efficiency for the data region can be computed by equation (1).

(Transmission efficiency for data region) =effective transmission capacity for data region)/(capacity of assigned data region)  (1)

Figure 8:
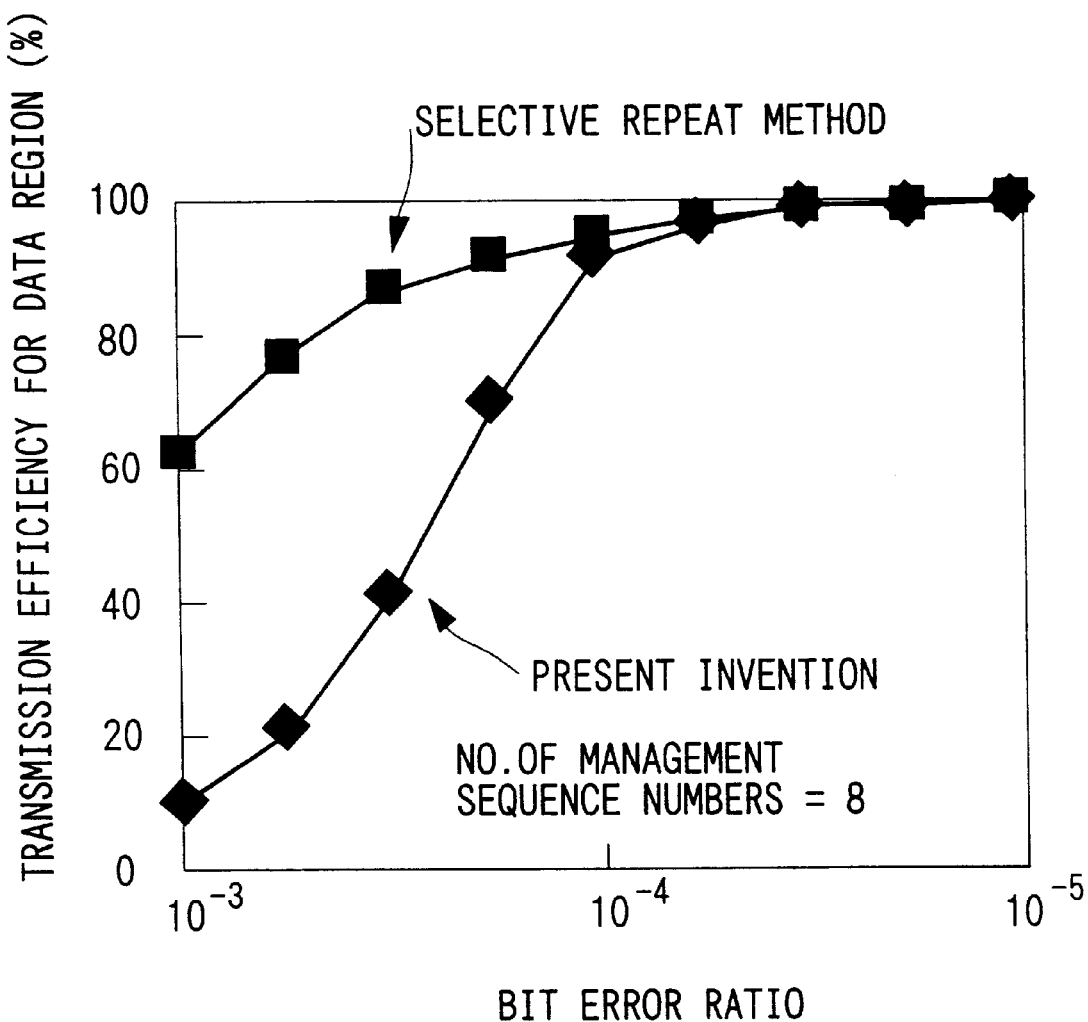
FIG. 8 is a graph illustrating an example of a relationship between transmission efficiency and BER (bit error ratio) for a data region.

FIG. 8 is a graph illustrating an example of a relationship between transmission efficiency and BER (bit error ratio) for the data region. The computational conditions for this graph are as follows:
1 frame period: 4 (msec)
Packet length: 424 (bits)
Error correction bit length: 16 (bits)
Sequence number bit length: 12 (bits)
Maximum number of cells which can be accommodated in one frame: 128 (cells/frame)
Transmission capacity: 14.8 (Mbit/sec)
Communication environment: random error As shown in FIG. 8, when only the data region is considered, then with the error compensating method according to the present invention the transmission efficiency is lower than with the SR system. However with actual error compensation, as well as the data region, the control information region also is used. Therefore. when evaluating transmission efficiency for error compensation, the control information region should also be considered. The transmission efficiency for where the control information region is also considered is computed by equation (2).

(transmission efficiency for where the control information region is also considered) =(bit quantity normally received by the reception equipment)/((capacity of control information region)+ (capacity of assigned data region))  (2)

Figure 9:
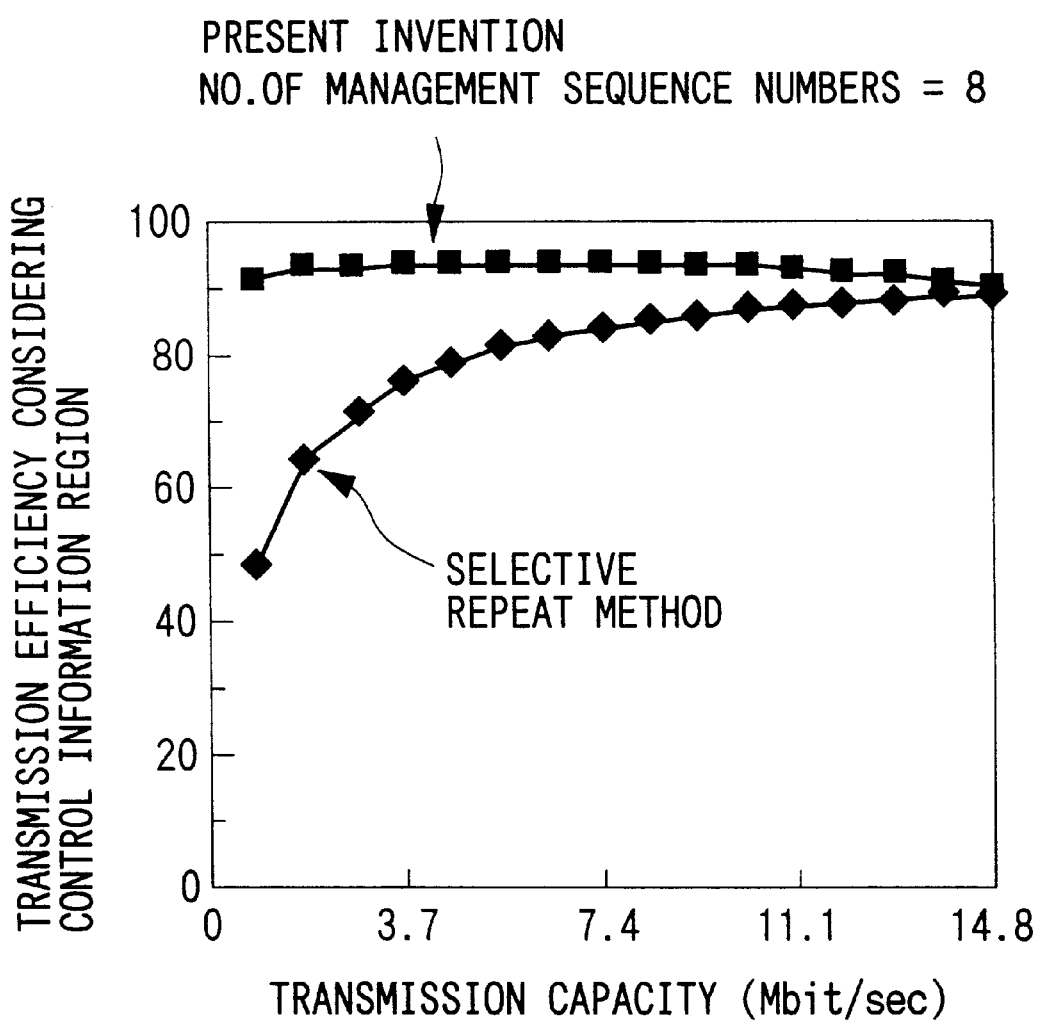
FIG. 9 is a graph illustrating an example of a relationship between transmission efficiency where the control information region is also considered, and input signal speed (transmission volume)
Figure 10:
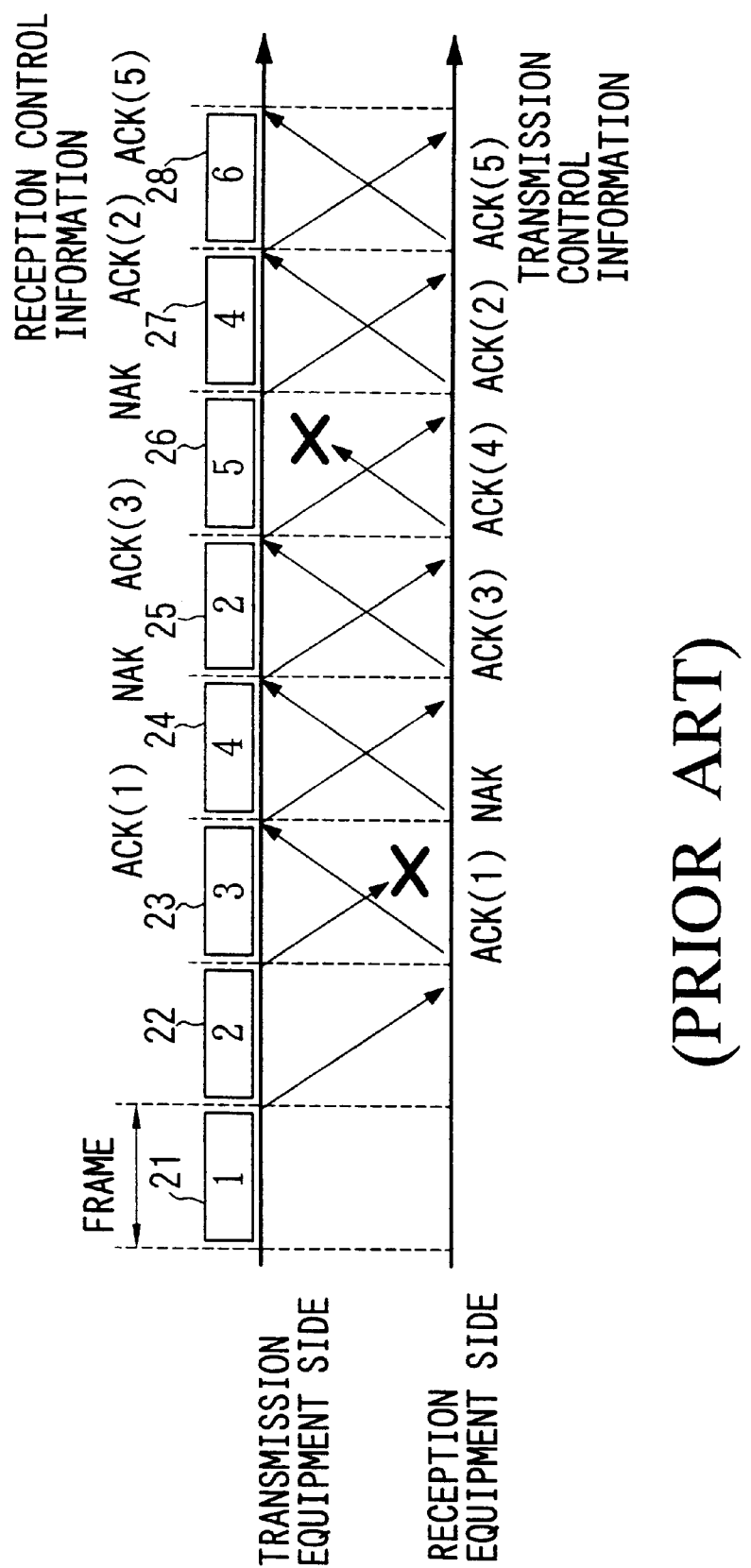
FIG. 10 is a explanation diagram illustrating an example of a conventional error compensation process which uses an ARQ method.
Figure 11:
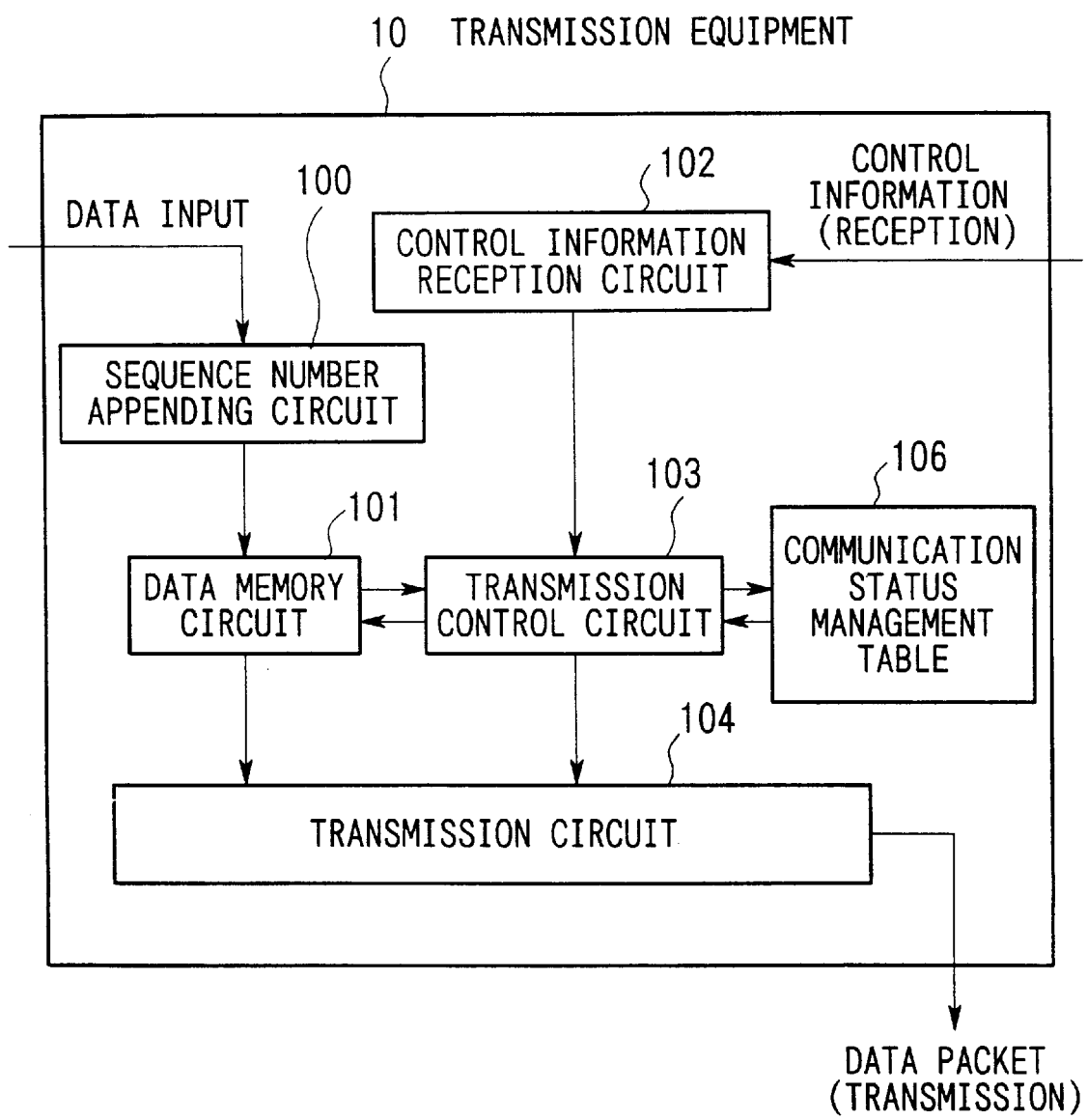
FIG. 11 is a block diagram illustrating a configuration example of transmission equipment in a conventional error compensating apparatus.
Figure 12:
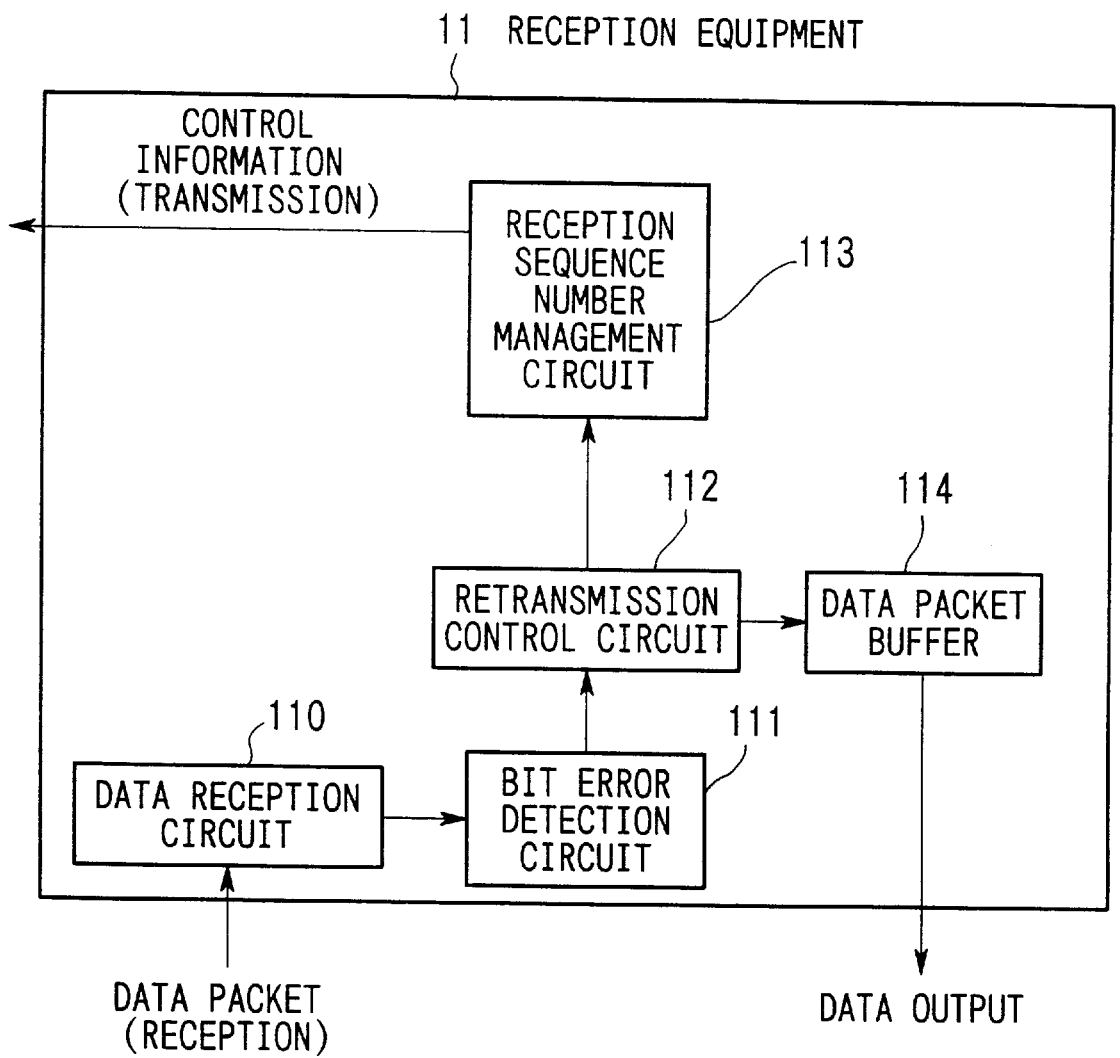
FIG. 12 is a block diagram illustrating a configuration example of reception equipment in a conventional error compensating apparatus.
Figure 13:
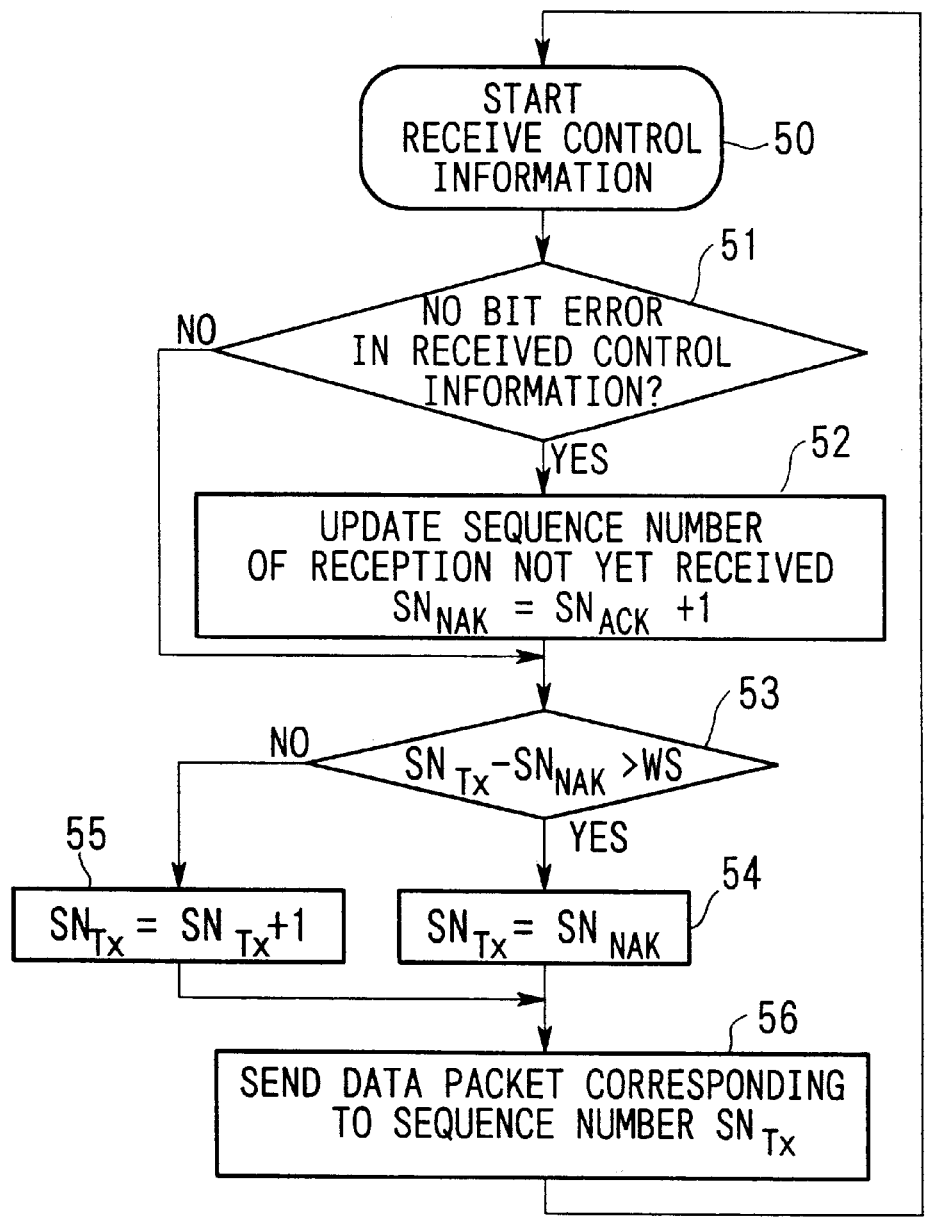
FIG. 13 is a flow chart for illustrating an example of the operation of the transmission equipment which constitutes the error compensating apparatus in the conventional error compensating apparatus which uses a GBN method.
Figure 14:
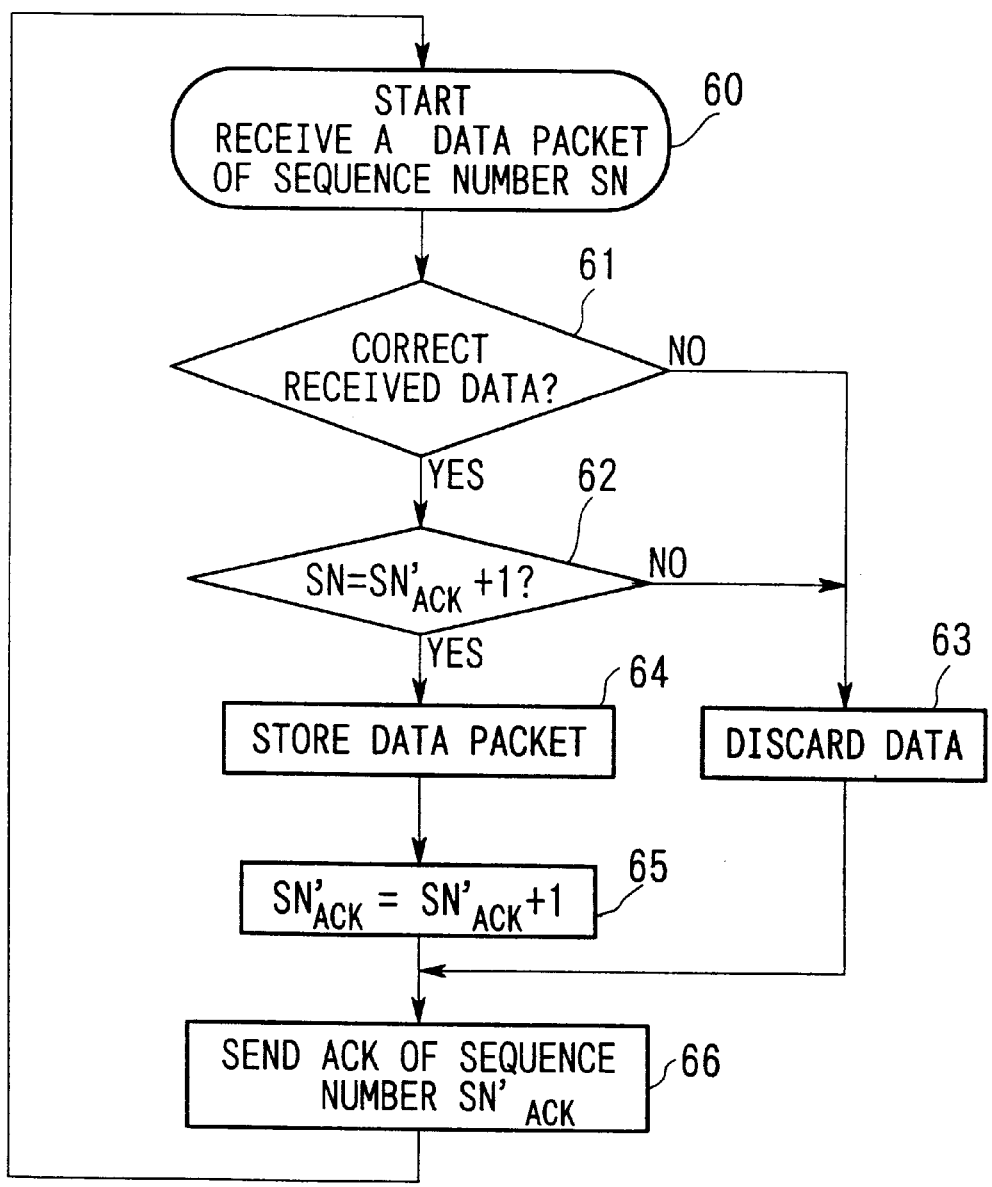
FIG. 14 is a flow chart for illustrating an example of the operation of the reception equipment which constitutes the error compensating apparatus in the conventional error compensating apparatus which uses a GBN method.
Figure 15:
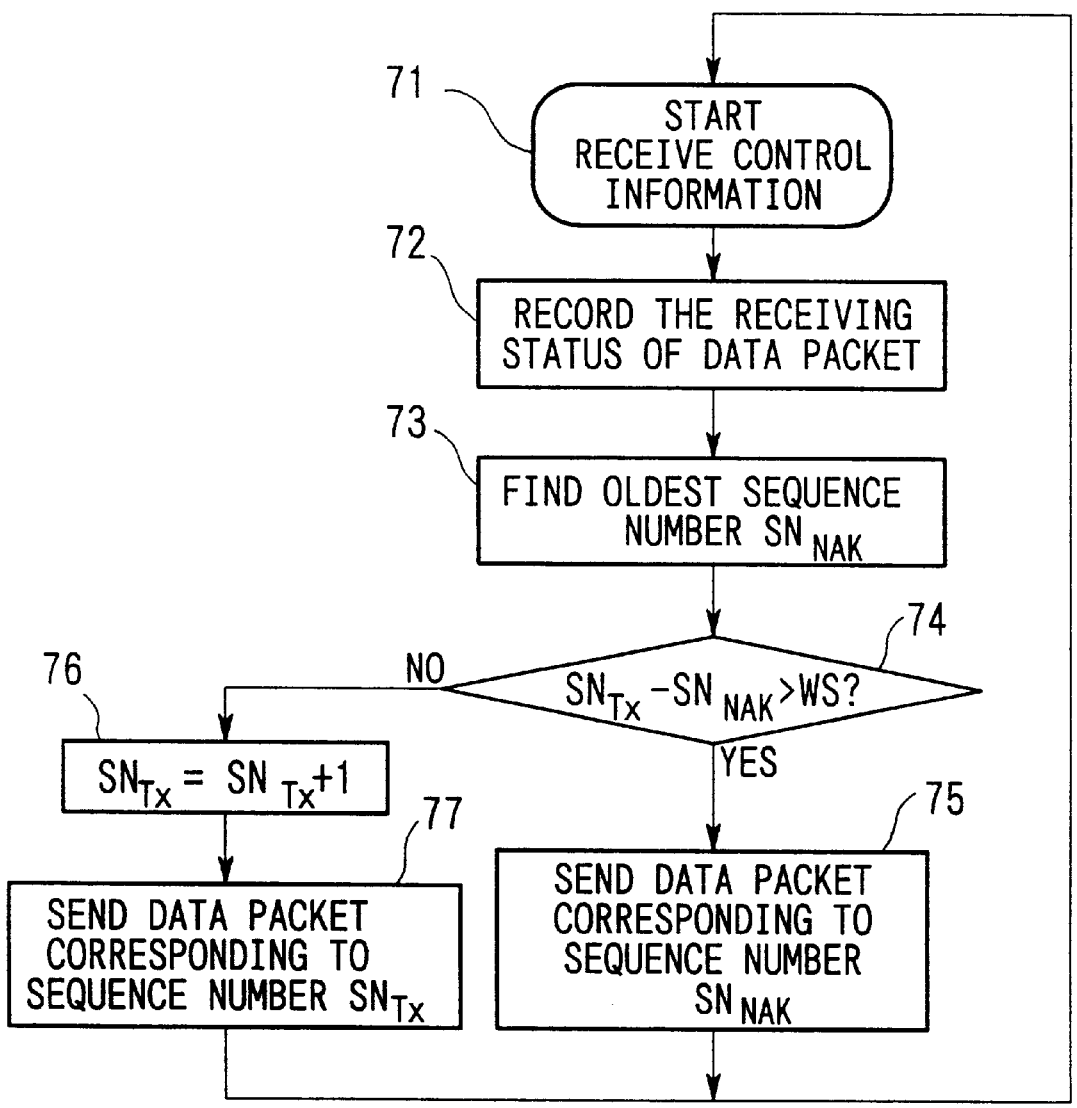
FIG. 15 is a flow chart for illustrating an example of the operation of the transmission equipment which constitutes the error compensating apparatus in the conventional error compensating apparatus which uses an SR method.
Figure 16:
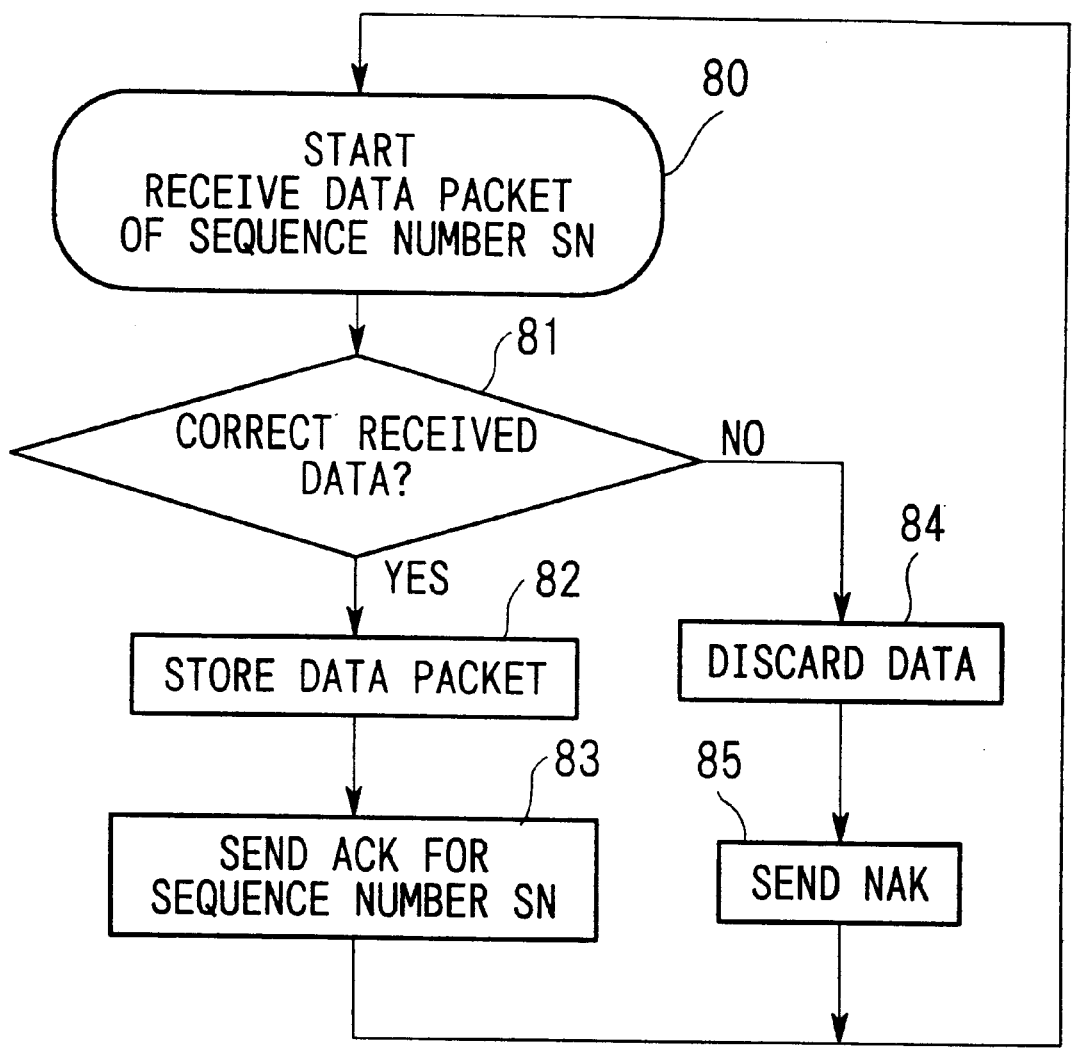
FIG. 16 is a flow chart for illustrating an example of the operation of the reception equipment which constitutes the error compensating apparatus in the conventional error compensating apparatus which uses an SR method.

FIG. 9 is a graph illustrating an example of a relationship between transmission efficiency where the control information region is also considered, and input signal speed (transmission capacity). The computational conditions for this graph are as follows:
1 frame period: 4 (msec)
Packet length: 424 (bits)
Error correction bit length: 16 (bits)
Sequence number bit length: 12 (bits)
Maximum number of cells which can be accommodated in one frame: 128 (cells/frame)
Communication environment: random error
Bit error rate: $1.0 \times 10^{-4}$ Here the capacity of the data region changes according to the input signal speed. On the other hand, the capacity of the control information region assigned to the respective users is fixed and does not depend on the input signal speed. Therefore, in the case where the capacity of the control information region (the fixed value) is set to a value where correspondence up to the maximum value of the input signal speed is possible. then with the SR system, the transmission efficiency drops as the input signal speed becomes less because the effect of the control information region increases. On the other hand, with the present invention. since the capacity of the control information region can be small, then even in the case where the input signal speed is small, there is no sudden drop in the transmission efficiency. As described above, the present invention has a higher transmission efficiency for the various input signal speeds compared to the SR system which has heretofore been considered to give ideal retransmission. It can therefore be concluded that the present invention is better than the SR system.

5. Addendum

With the present invention as described above, by suppressing the amount of control information being managed, then it is possible to efficiently utilize the capacity of the control circuit, and also any increase in processing due to retransmission can be kept to a minimum.

The specific construction of the present invention is not limited to that of the above embodiments, and embodiments with design modifications and the like which are within the scope of the invention and do not depart from the gist thereof, are also covered by the present invention. For example the present invention may be applied not only to wireless transmission but also to communication through wire.

Moreover, the present invention can be made from a computer comprising a CPU (central processing unit) and its peripheral circuits. In this case, the computer can be operated as the apparatus illustrated by the above respective embodiments, using a control program stored in a ROM (read only memory) or the like.

What is claimed is:

1. An error compensating apparatus comprising:

transmission equipment incorporating a sequence number appending circuit for appending sequence numbers to data packets, one by one, which store data for transmission, a data memory circuit for storing data packets to which sequence numbers haste been appended, a control information reception circuit for receiving control information which includes a plurality of sequence numbers, a transmission sequence number assigning circuit for assigning said sequence numbers, which is accommodated in the received control information, and a series of sequence numbers following from the sequence number corresponding to the newest data packet amongst said sequence numbers, a transmission control circuit for carrying out a transmission assignment of the data packets corresponding to the assigned sequence numbers, and a transmission circuit for reading a data packet from the data memory circuit in accordance with the transmission assignment and transmitting the data packet to the reception equipment via the transmission path; and reception equipment incorporating a data reception for receiving data packets from the transmission equipment, a bit error detection circuit for judging if a bit error has occurred for each received data packet;

a sequence number separation circuit for acquiring a sequence number corresponding to said data packet from the data packets for which a bit error has not occurred, a data packet buffer which stores and outputs data in the data packets, a reception sequence number management circuit for managing the sequence number of a data packet not received, updating the management contents based on the detection result of the bit error, and periodically outputting a plurality of sequence numbers of the managed sequence numbers as control information, a retransmission control circuit for sending back the output sequence numbers; to the transmission equipment via the transmission path as control information, and wherein the number of sequence numbers outputted as control information is constant irrespective of the number of the data packets not received.

2. A method of compensating for errors comprising:

a transmitting method including a method of assigning sequence numbers to be transmitted, involving a step for assigning N, where N>1, sequence numbers $S(1)$~$S(N)$ within control information, to the sequence numbers of the data packets to be transmitted, a step for assigning $S(m)+1, S(m)+2, \ldots S(m)+M-N$ to the sequence number of the data packet to be transmitted, where $S(m)$ is the sequence number corresponding to the newest data packet amongst $S(1)$~$S(N)$, and M is the maximum number of data packets which can be accommodated on one frame; and receiving method including a method of creating control information involving a step where a data packet is received, a sequence number appended to the data packet is read and wherein the sequence number is SN, a step for determining if a bit error has occurred in the data packet, a step for storing the data packet upon determination that a bit error has not occurred, a step for discarding said data packet upon determination that a bit error has occurred, a step, continuing from the step of discarding said data packet, for removing the sequence number SN from a group of sequence numbers of data packets not received, a step, continuing from the step of removing the sequence number SN from a group of sequence numbers of data packets not received, for sending back N sequence numbers of the data packets not received as control information when the process for all of the data packets inside one frame has been completed, and returning to the step where a data packet is received, a sequence number appended to the data packet is read and wherein the sequence number is SN; and wherein the number N of sequence numbers outputted as control information is constant irrespective of the number of the data packets not received.

3. A medium in which an error compensation program is stored, comprising:

a sequence number assigning program for executing in a computer a step for assigning N, where N>1, sequence numbers $S(1)$~$S(N)$ within control information, to the sequence numbers of the data packets to be transmitted, a step for assigning $S(m)+1, S(m)+2. \ldots, S(m)+M-N$ to the sequence number of the data packet to be transmitted, where $S(m)$ is the sequence number corresponding to the newest data packet amongst $S(1)$~$S(N)$, and M is the maximum number of data packets which can be accommodated in one frame; and a control information creating program for executing in a computer a step where a data packet is received, a sequence number appended to the data packet is read and wherein the sequence number is SN, a step for determining if a bit error has occurred in the data packet, a step for storing the data packet, upon determination that a bit error has not occurred, a step for discarding said data packet, upon determination that a bit error has occurred, a step, continuing from the step of storing the data packet upon determination that a bit error has not occurred, for removing the sequence number SN from a group of sequence numbers of data packets not received, a step, continuing from either the step for discarding said data packet upon determination that a bit error has occurred or the step for removing the sequence number SN from a group of sequence numbers of data not received, for sending back N sequence numbers of the data packets not received as control information when the processing for all of the data packets inside one frame has been completed, and returning to the step where a data packet is received, a sequence number appended to the data packet is read and the sequence number is made SN; and wherein the number N of sequence numbers outputted as control information is constant irrespective of the number of the data packets not received.

* * * * *

UNITED STATES PATENT AND TRADEMARK OFFICE
CERTIFICATE OF CORRECTION

PATENT NO. : 6,330,699 B1 Page 1 of 1
DATED : December 11, 2001
INVENTOR(S) : Masafumi Yoshioka et al.

It is certified that error appears in the above-identified patent and that said Letters Patent is hereby corrected as shown below:

<u>Title page,</u>
Item [57], ABSTRACT,
Line 8, "numbers. and" should read -- numbers, and --.
Line 18, "Information" should read -- information --.

<u>Column 17,</u>
Line 34, "haste" should read -- have --.

<u>Column 18,</u>
Line 4, "numbers; to" should read -- numbers to --.
Line 16, "S(m)+2, ... S(m)+M-N" should read -- S(m)+2, ...., S(m)+M-N --.
Line 56, "S(m)+2, ... S(m)+M-N" should read -- S(m)+2, ...., S(m)+M-N --.

Signed and Sealed this

Tenth Day of September, 2002

*Attest:*

*Attesting Officer*

JAMES E. ROGAN
*Director of the United States Patent and Trademark Office*